(12) United States Patent
Kikuchi

(10) Patent No.: US 7,381,763 B2
(45) Date of Patent: Jun. 3, 2008

(54) FLAME RETARDANT AROMATIC POLYCARBONATE RESIN COMPOSITION

(75) Inventor: Seiji Kikuchi, Chiyoda-ku (JP)

(73) Assignee: Teijin Chemicals, Ltd., Toyko (JP)

( * ) Notice: Subject to any disclaimer, the term of this patent is extended or adjusted under 35 U.S.C. 154(b) by 0 days.

(21) Appl. No.: 11/282,599

(22) Filed: Nov. 21, 2005

(65) Prior Publication Data

US 2006/0079614 A1    Apr. 13, 2006

Related U.S. Application Data

(63) Continuation of application No. 10/478,996, filed as application No. PCT/JP03/03839 on Mar. 27, 2003, now abandoned.

(30) Foreign Application Priority Data

Mar. 27, 2002  (JP) ............................. 2002-088309

(51) Int. Cl.
   *C08K 5/523*   (2006.01)
(52) U.S. Cl. ...................... 524/127; 524/140; 524/141; 524/449; 524/451; 524/456
(58) Field of Classification Search ................ 524/127, 524/140–141, 449, 451, 456, 459
   See application file for complete search history.

(56) References Cited

U.S. PATENT DOCUMENTS

| | | | |
|---|---|---|---|
| 4,298,514 A | 11/1981 | Lee, Jr. | |
| 5,082,888 A | 1/1992 | Abe et al. | |
| 5,723,526 A | 3/1998 | Nagasawa | |
| 5,777,021 A | 7/1998 | Nakano | |
| 5,961,915 A | 10/1999 | Toyouchi et al. | |
| 5,965,655 A | 10/1999 | Mordecai et al. | |
| 6,316,579 B1 | 11/2001 | Katayama et al. | |
| 6,329,451 B2 | 12/2001 | Matsumoto et al. | |
| 6,349,943 B1 | 2/2002 | Ishii et al. | |
| 6,355,767 B1 | 3/2002 | Takagi | |
| 6,403,683 B1 | 6/2002 | Kobayashi | |
| 6,737,465 B2 | 5/2004 | Seidel et al. | |
| 6,780,917 B2 | 8/2004 | Hashimoto | |

FOREIGN PATENT DOCUMENTS

| | | |
|---|---|---|
| DE | 196 42 491 A | 4/1998 |
| DE | 100 14 608 A | 9/2001 |
| EP | 0 324 392 A | 7/1989 |
| EP | 1 026 205 | 8/2000 |
| JP | 01-185360 | 7/1989 |
| JP | 2-99549 | 4/1990 |
| JP | 02-199162 | 8/1990 |
| JP | 05-287185 | 11/1993 |
| JP | 06-207089 | 7/1994 |
| JP | 8-115589 | 5/1996 |
| JP | 09-007208 | 1/1997 |
| JP | 09-012733 | 1/1997 |
| JP | 09-048912 | 2/1997 |
| JP | 09-255796 | 9/1997 |
| JP | 09-316316 | 12/1997 |
| JP | 10-338805 | 12/1998 |
| JP | 2001-89780 | 4/2001 |
| JP | 2001-164105 | 6/2001 |
| JP | 2003-518539 | 6/2003 |
| WO | 96/06136 | 2/1996 |

OTHER PUBLICATIONS

Database WPI Section Ch, Week 199940, Derwent Publications Ltd., AN 1999-474180 XP 002351478, abstract of JP 11 199767, Jul. 27, 1999.
Database WPI Section Ch, Week 198206, Derwent Publications Ltd., AN 1982-10707E XP 002351479, abstract of JP 56 167749, Dec. 23, 1981.
Database WPI Section Ch, Week 199937, Derwent Publications Ltd., AN 1999-439716 XP 002351480, abstract of JP 11 181268, Jul. 6, 1999.
Database WPI Section Ch, Week 198509, Derwent Publications Ltd., AN 1985-053896 XP 002351481, abstract of JP 60 011554, Jan. 24, 1985.
Database WPI Section Ch, Week 199949, Derwent Publications Ltd., AN 1999-574340 XP 002351482, abstract of JP 11 199768.
Database WPI Section Ch, Week 199102, Derwent Publications Ltd., AN 1991-011067 XP 002351483, abstract of JP 02 283760.

*Primary Examiner*—Peter Szekely
(74) *Attorney, Agent, or Firm*—Wenderoth, Lind & Ponack, L.L.P.

(57) ABSTRACT

A flame retardant aromatic polycarbonate resin composition comprising:
(A) an aromatic polycarbonate resin (component A);
(B) an acrylonitrile-styrene copolymer (component B);
(C) inorganic fillers (components C);
(D) an organic phosphorus compound-based flame retardant (component D); and
(E) a fluorine-containing anti-dripping agent (component E),
   the amounts of the above components are specific and particularly the components C consist of (C1) mica and (C2) talc and/or wollastonite in a specific ratio,
   and a molded article formed from the resin composition.

According to the present invention, there are provided a resin composition which has excellent mechanical properties, flame retardancy and dimensional stability, is light in weight and rarely wears away a mold and a molded article of the resin composition.

16 Claims, 4 Drawing Sheets

[4-A]

[4-B]

[4-C]

FLAME RETARDANT AROMATIC POLYCARBONATE RESIN COMPOSITION

This is a continuation of Ser. No. 10/478,996, filed Nov. 26, 2003, now abandoned, which is a 371 of PCT/JP03/03839, filed Mar. 27, 2003.

BACKGROUND OF THE INVENTION

1. Field of the Invention

The present invention relates to a flame retardant aromatic polycarbonate resin composition. More specifically, it relates to a resin composition which comprises (i) resin components including an aromatic polycarbonate resin as the main resin component and a small amount of an acrylonitrile-styrene copolymer, (ii) inorganic fillers including mica having a predetermined particle diameter (C-1) and talc and/or wollastonite (C-2), (iii) an organic phosphorus compound as a flame retardant and (iv) a fluorine-containing compound as a anti-dripping agent, provides (a) a molded article having high stiffness, strength and dimensional accuracy, has (b) satisfactory flame retardancy in spite of a relatively small amount of the flame retardant, and (c) rarely wears away a mold though the inorganic fillers are contained. The resin composition of the present invention is suitable for molding parts which need flame retardancy and high dimensional accuracy, such as chassis and frames.

2. Description of Prior Art

High stiffness, strength and dimensional accuracy (low anisotropy) and excellent flame retardancy are required for plastic materials for use in the chassis or frames (may be simply referred to as "optical unit chassis" hereinafter) of apparatuses having an optical unit, such as laser beam printers, copying machines and projectors. A large number of proposals have already been made for the plastic materials for chassis. Low anisotropy is still strongly required for optical unit chassis. The above various apparatuses having an optical unit have been manufactured for a long time and a lot of know-how has already been accumulated. In the field of the apparatuses having an optical unit under the above situation, new models having higher performance have been developed whereas general-purpose models have been improved, placing stress on a reduction in cost. In this case, plastic materials may have problems with cost required for their molds and the service lives of the molds. That is, a material which rarely wears away a mold (to be referred to as "low mold wearability" hereinafter) is sought for.

A large number of resin compositions suitable for use as molded parts such as chassis and frames have been proposed up till now. (i) JP-A 5-287185 (the term "JP-A" as used herein means an "unexamined published Japanese patent application") discloses a resin composition prepared by loading an aromatic polycarbonate resin having a specific molecular weight with a large amount of a glass fiber or the like. And, (ii) JP-A 6-207089 discloses a resin composition which comprises an aromatic polycarbonate resin having a specific molecular weight, a fiber having a non-circular section and a lamellar inorganic filler and achieves low warpage. Further, (iii) JP-A 9-12733 discloses an optical write unit fixing chassis formed from a resin composition which comprises an aromatic polycarbonate resin and mica having a specific particle diameter and a specific thickness. The invention disclosed by JP-A 9-12733 has high stiffness, low warpage and torsion based on low anisotropy, and excellent flame retardancy. That is, it has favorable characteristic properties required for optical unit chassis. However, it is hardly said that molded articles which satisfy all the requirements such as high stiffness, high strength, low anisotropy (high dimensional accuracy), flame retardancy and low mold wearability are obtained from the composition of this invention.

JP-A 1-185360 discloses a resin composition which comprises an aromatic polycarbonate, polycaprolactone and carbon fiber and teaches that the composition has reduced mold wearability. However, the invention disclosed by the above publication does not take into full consideration low anisotropy and fails to disclose technical information on how sufficiently high strength is retained after low anisotropy is achieved.

JP-A 8-115589 discloses a CD-ROM part which comprises a polycarbonate resin, flaky inorganic filler and phosphate compound having a specific structure. However, it is hardly said that the publication discloses a resin composition which satisfies all the requirements such as high stiffness, high strength, excellent flame retardancy and low mold wearability.

JP-A 2001-164105 discloses a resin composition which comprises an aromatic polycarbonate resin, flame retardant, inorganic filler which consists of a glass fiber and talc in a specific ratio and polytetrafluoroethylene having fibril forming capability and teaches that the composition has high stiffness, strength and dimensional accuracy and excellent flame retardancy. However, the composition has room for further improvement as a material for use in models with greater importance attached to a cost reduction.

SUMMARY OF THE INVENTION

It is an object of the present invention to provide an aromatic polycarbonate resin composition which is particularly suitable for use as an optical unit chassis or frame molded article and which satisfies all the requirements such as high stiffness, strength and dimensional accuracy (low anisotropy), excellent flame retardancy and low mold wearability in a well-balanced manner.

The inventor of the present invention has conducted intensive studies to attain the above object and has found that a molded article which can attain the object of the present invention can be obtained from a resin composition which comprises a combination of an aromatic polycarbonate resin and a specific amount of an acrylonitrile-styrene copolymer (AS resin) as resin components, a combination of mica having a specific particle diameter and talc or wollastonite in a specific ratio as inorganic fillers, an organic phosphorus compound as a flame retardant and a fluorine-containing anti-dripping agent in a specific ratio. That is, it has been found that the resin composition provides a molded article having high stiffness, strength and dimensional accuracy, that excellent flame retardancy is obtained by using a relatively small amount of a flame retardant and that the wearability of a mold is extremely low.

MEANS FOR SOLVING THE PROBLEMS

According to the present invention, there is provided a flame retardant aromatic polycarbonate resin composition comprising:

(A) an aromatic polycarbonate resin (component A);

(B) an acrylonitrile-styrene copolymer (component B);

(C) inorganic fillers (components C);

(D) an organic phosphorus compound-based flame retardant (component D); and
(E) a fluorine-containing anti-dripping agent (component E), the amounts of the above components satisfying the following conditions (i) to (iii).

(i) The total amount of the components A and B is 50 wt % or more, the total amount of the components C is 15 to 35 wt % and the amount of the component D is 3 to 15 wt % based on 100 wt % of the total of the components A to D, and the amount of the component E is 0.02 to 2 parts by weight based on 100 parts by weight of the total of the component A to D;

(ii) the amount of the component A is 75 to 95 parts by weight and the amount of the component B is 5 to 25 parts by weight based on 100 parts by weight of the total of the components A and B; and (iii) the components C consist of (C1) mica having an average particle diameter of 30 to 300 μm (component C-1) and (C2) at least one filler (component C-2) selected from the group consisting of talc and wollastonite, the amount of the component C-1 is 10 to 25 wt % and the amount of the component C-2 is 3 to 15 wt % based on 100 wt % of the total of the components A to D, and the amount of the component C-1 is 40 to 90 parts by weight based on 100 parts by weight of the total of the components C-1 and C-2.

The inventor of the present invention has conducted further studies and has found that when a predetermined amount of a higher fatty acid ester of a monohydric or polyhydric alcohol (component F) is mixed with the resin composition as a release agent, releasability from a mold becomes extremely excellent compared with when different types of release agents are mixed.

Thus, according to the present invention, there is also provided a flame retardant aromatic polycarbonate resin composition comprising:

(A) an aromatic polycarbonate resin (component A);
(B) an acrylonitrile-styrene copolymer (component B);
(C) inorganic fillers (components C);
(D) an organic phosphorus compound-based flame retardant (component D);
(E) a fluorine-containing anti-dripping agent (component E); and
(F) a higher fatty acid ester of a monohydric or polyhydric alcohol (component F), the amounts of the above components satisfying the following conditions (i) to (iii).

(i) The total amount of the components A and B is 50 wt % or more, the total amount of the components C is 15 to 35 wt %, and the amount of the component D is 3 to 15 wt % based on 100 wt % of the total of the components A to D, and the amount of the component E is 0.02 to 2 parts by weight and the amount of the component F is 0.01 to 2 parts by weight based on 100 parts by weight of the total of the components A to D;

(ii) the amount of the component A is 75 to 95 parts by weight and the amount of the component B is 5 to 25 parts by weight based on 100 parts by weight of the total of the components A and B; and (iii) the components C consist of (C1) mica having an average particle diameter of 30 to 300 μm (component C-1) and (C2) at least one filler (component C-2) selected from the group consisting of talc and wollastonite, the amount of the component C-1 is 10 to 20 wt % and the amount of the component C-2 is 5 to 15 wt % based on 100 wt % of the total of the components A to D, and the amount of the component C-1 is 40 to 90 parts by weight based on 100 parts by weight of the total of the components C-1 and C-2.

A detailed description is given of the resin composition of the present invention. Each component forming the resin composition is first described.

In the resin composition of the present invention, the resin components substantially consist of an aromatic polycarbonate resin (component A) and an acrylonitrile-styrene copolymer (component B). The acrylonitrile-styrene copolymer as the component B is generally called "AS resin".

The aromatic polycarbonate resin as the component A may be an aromatic polycarbonate resin known per se which has been used in various molded articles. That is, it is obtained by reacting a diphenol with a carbonate precursor. The reaction method is an interfacial polymerization method, melt ester exchange method, carbonate prepolymer solid-phase ester exchange method, or cyclic carbonate compound ring-opening polymerization method.

Typical examples of the diphenol include 2,2-bis(4-hydroxyphenyl)propane (so-called bisphenol A), 2,2-bis{(4-hydroxy-3-methyl)phenyl}propane, 2,2-bis(4-hydroxyphenyl)butane, 2,2-bis(4-hydroxyphenyl)-3-methylbutane, 9,9-bis{(4-hydroxy-3-methyl)phenyl}fluorene, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane and α,α'-bis(4-hydroxyphenyl)-m-diisopropylbenzene. A divalent aliphatic alcohol such as 1,4-cyclohexanedimethanol may also be copolymerized. Out of aromatic polycarbonate resins obtained from the above diphenols, a homopolymer of bisphenol A is particularly preferred. The aromatic polycarbonate resin is preferred because it is excellent in impact resistance.

The carbonate precursor is a carbonyl halide, carbonate ester, haloformate or the like, as exemplified by phosgene, diphenyl carbonate and dihaloformate of a diphenol.

To produce an aromatic polycarbonate resin by reacting the above diphenol with the above carbonate precursor in accordance with the interfacial polycondensation or melt ester exchange method, a catalyst, terminal capping agent and antioxidant for preventing the oxidation of the diphenol may be optionally used. The aromatic polycarbonate resin may be a branched polycarbonate containing a polyfunctional aromatic compound having a functionality of 3 or more. Examples of the polyfunctional aromatic compound having a functionality of 3 or more include 1,1,1-tris(4-hydroxyphenyl)ethane and 1,1,1-tris(3,5-dimethyl-4-hydroxyphenyl)ethane.

When a polyfunctional compound for forming a branched polycarbonate is contained, the amount thereof is 0.001 to 1 mol %, preferably 0.005 to 0.5 mol %, particularly preferably 0.01 to 0.3 mol % based on the aromatic polycarbonate resin. Particularly in the case of the melt ester exchange method, a branched structure may be formed by a side reaction. The amount of the branched structure is 0.001 to 1 mol %, preferably 0.005 to 0.5 mol %, particularly preferably 0.01 to 0.3 mol % based on the aromatic polycarbonate resin. This amount can be calculated by $^1$H-NMR measurement.

Further, the aromatic polycarbonate resin of the present invention may be a polyester carbonate resin containing an aromatic or aliphatic dicarboxylic acid. The aliphatic dicarboxylic acid is, for example, an aliphatic dicarboxylic acid having 8 to 20 carbon atoms, preferably 10 to 12 carbon atoms. The aliphatic dicarboxylic acid may be linear, branched or cyclic. The aliphatic dicarboxylic acid is preferably an α,ω-dicarboxylic acid. Preferred examples of the aliphatic dicarboxylic acid include linear saturated aliphatic dicarboxylic acids such as sebacic acid (decanoic diacid), dodecanoic diacid, tetradecanoic diacid, octadecanoic diacid and icosanoic diacid.

A polycarbonate-polyorganosiloxane copolymer containing a polyorganosiloxane unit may also be used.

The aromatic polycarbonate resin may be a mixture of two or more aromatic polycarbonates selected from polycarbonates obtained from different diphenols, branched polycarbonates having a branched component, polyester carbonates and polycarbonate-polyorganosiloxane copolymers. Further, it may be a mixture of two or more selected from aromatic polycarbonates produced by the following different methods and aromatic polycarbonates produced by using different terminal capping agents.

The polymerization reaction of an aromatic polycarbonate by the interfacial polycondensation method is generally a reaction between a diphenol and phosgene in the presence of an acid binder and an organic solvent. As the acid binder is used an alkali metal hydroxide such as sodium hydroxide or potassium hydroxide, or amine compound such as pyridine. As the organic solvent is used a halogenated hydrocarbon such as methylene chloride or chlorobenzene. A tertiary amine, quaternary ammonium compound or quaternary phosphonium compound such as triethylamine, tetra-n-butylammonium bromide or tetra-n-butylphosphonium bromide may be used as a catalyst to promote the reaction. The reaction temperature is generally 0 to 40° C., the reaction time is 10 minutes to 5 hours, and pH during the reaction is preferably maintained at 9 or more.

A terminal capping agent is generally used in the polymerization reaction. A monofunctional phenol may be used as the terminal capping agent. Examples of the monofunctional phenol include phenol, p-tert-butylphenol, p-cumylphenol and isooctylphenol. These terminal capping agents may be used alone or in combination of two or more.

The reaction carried out by the melt ester exchange method is generally an ester exchange reaction between a diphenol and a carbonate ester which is carried out in the presence of an inert gas by mixing together the diphenol and the carbonate ester under heating and distilling off the formed alcohol or phenol. The reaction temperature, which changes according to the boiling point or the like of the formed alcohol or phenol, is generally 120 to 350° C. In the latter stage of the reaction, the pressure of the reaction system is reduced to $1.33 \times 10^3$ to 13.3 Pa to facilitate the distillation off of the formed alcohol or phenol. The reaction time is generally about 1 to 4 hours.

The carbonate ester is an ester such as an aryl group or an aralkyl group having 6 to 10 carbon atoms which may be substituted, or an alkyl group having 1 to 4 carbon atoms. Of these, diphenylcarbonate is preferable.

To accelerate the rate of polymerization, a polymerization catalyst may be used. Examples of the polymerization catalyst include alkali metal compounds such as sodium hydroxide, potassium hydroxide, and sodium salts and potassium salts of a diphenol; alkali earth metal compounds such as calcium hydroxide, barium hydroxide and magnesium hydroxide; and nitrogen-containing basic compounds such as tetramethylammonium hydroxide, tetraethylammonium hydroxide, trimethylamine and triethylamine. Further, catalysts which are generally used for an esterification reaction or ester exchange reaction, such as alkoxides and organic acid salts of an alkali (earth) metal, boron compounds, germanium compounds, antimony compounds, titanium compounds and zirconium compounds may also be used. The catalysts may be used alone or in combination of two or more. The amount of the polymerization catalyst is preferably $1 \times 10^{-8}$ to $1 \times 10^{-3}$ equivalent, more preferably $1 \times 10^{-7}$ to $5 \times 10^{-4}$ equivalent based on 1 mol of the diphenol as a raw material.

In the reaction carried out by the melt ester exchange method, to reduce the number of phenolic terminal groups of the aromatic polycarbonate resin, a compound such as 2-chlorophenylphenyl carbonate, 2-methoxycarbonylphenylphenyl carbonate or 2-ethoxycarbonylphenylphenyl carbonate may be added in the latter stage of a polycondensation reaction or after the end of the polycondensation reaction.

Further, a deactivator for neutralizing the activity of the catalyst is preferably used in the melt ester exchange method. The deactivator is preferably used in an amount of 0.5 to 50 mols based on 1 mol of the residual catalyst. Or it is used in an amount of 0.01 to 500 ppm, preferably 0.01 to 300 ppm, particularly preferably 0.01 to 100 ppm based on the aromatic polycarbonate resin after polymerization. Preferred examples of the deactivator include phosphonium salts such as tetrabutylphosphonium dodecylbenzene sulfonate and ammonium salts such as tetraethylammonium dodecylbenzyl sulfonate.

The viscosity average molecular weight of the aromatic polycarbonate resin is not particularly limited but preferably 15,000 to 50,000 in the present invention. The lower limit of the viscosity average molecular weight is preferably 16,000, more preferably 17,000, particularly preferably 18,000. The upper limit of the viscosity average molecular weight is preferably 26,000, more preferably 25,000. The above viscosity average molecular weight is particularly preferred when the aromatic polycarbonate resin is contained in an amount of 50 wt % or more, preferably 70 wt % or more based on 100 wt % of the component A. When the viscosity average molecular weight of the aromatic polycarbonate is lower than 15,000, impact strength and flame retardancy are apt to deteriorate. When the viscosity average molecular weight is higher than 50,000, fluidity lowers which is not preferred in the present invention.

Two or more aromatic polycarbonates may be used in combination. In this case, it is naturally possible to mix a polycarbonate resin having a viscosity average molecular weight outside the above range.

A mixture of an aromatic polycarbonate having a viscosity average molecular weight higher than 50,000 has satisfactory melt tension due to high entropy elasticity. Accordingly, it has favorable properties for forming a colored layer. When it is used as a component of a substrate layer, it hardly causes a molding failure based on rheology behavior typified by the prevention of jetting, gas assist stability and foaming stability.

A mixture with an aromatic polycarbonate resin having a viscosity average molecular weight of 80,000 or more is preferred and a mixture with an aromatic polycarbonate resin having a viscosity average molecular weight of 100,000 or more is more preferred. That is, a mixture whose molecular weight distribution has two or more peaks observed by a measurement method such as GPC (Gel Permeation Chromatography) can be preferably used.

In the aromatic polycarbonate resin (component A) of the present invention, the amount of its phenolic hydroxyl group is preferably 30 eq/ton or less, more preferably 25 eq/ton or less, much more preferably 20 eq/ton or less. It is possible to reduce the above value to 0 eq/ton substantially by fully reacting a terminal capping agent. The amount of the phenolic hydroxyl group based on the weight of the polymer is obtained by calculating the molar ratio of a diphenol unit having a carbonate bond, a diphenol unit having a phenolic hydroxyl group and the unit of the terminal capping agent by $^1$H-NMR measurement.

The viscosity average molecular weight (M) of the component A as used herein is obtained by first obtaining a specific viscosity calculated from the following equation using a solution of 0.7 g of an aromatic polycarbonate resin dissolved in 100 ml of methylene chloride at 20° C. with an Ostwald viscometer, Specific viscosity $(\eta sp) = (t - t_0)/t_0$

[$t_0$ is the number of seconds required for dropping methylene chloride and t is the number of seconds required for dropping a sample solution] and inserting the obtained specific viscosity into the following equation.

$\eta sp/c = [\eta] + 0.45 \times [\eta]^2 c$ ([$\eta$] is an intrinsic viscosity)

$[\eta] = 1.23 \times 10^{-4} M^{0.83}$ $c = 0.7$

The component A of the present invention may be a mixture of two or more polycarbonates, such as a mixture of polycarbonates which are obtained from different diphenols, a mixture of a polycarbonate obtained by using a terminal capping agent and a polycarbonate obtained by using no terminal capping agent, a mixture of a linear polycarbonate and a branched polycarbonate, a mixture of polycarbonates manufactured by different processes, a mixture of polycarbonates which are obtained by using different terminal capping agents, a mixture of a polycarbonate and a polyester carbonate, or a mixture of polycarbonates which differ from each other in viscosity average molecular weight.

In the resin composition of the present invention, the component B which is a resin component like the component A is an acrylonitrile-styrene copolymer generally called "AS resin". As for the amount of each component (monomer) in the copolymer (AS resin) as the component B, the amount of acrylonitrile is 5 to 50 wt %, preferably 15 to 35 wt % and the amount of styrene is 95 to 50 wt %, preferably 85 to 65 wt % based on 100 wt % of the whole resin. The copolymer as the component B may contain a small amount of a copolymerizable vinyl compound other than acrylonitrile and styrene. The amount of the vinyl compound is 15 wt % or less, preferably 10 wt % or less based on the component B. A conventionally known polymerization initiator or chain transfer agent used for the polymerization reaction of the component B may be optionally used.

The component B (AS resin) may be manufactured by bulk polymerization, solution polymerization, suspension polymerization or emulsion polymerization, preferably bulk polymerization or suspension polymerization. Copolymerization may be either one-stage copolymerization or multistage copolymerization. The weight average molecular weight measured by GPC in terms of standard polystyrene of the component B (AS resin) is preferably 40,000 to 200,000. Its lower limit is preferably 50,000, more preferably 70,000. Its upper limit is preferably 160,000, more preferably 150,000.

The resin composition of the present invention is characterized in that two different types of inorganic fillers (components C) are used in combination. One of the inorganic fillers (components C) is mica having a specific average particle diameter (component C-1) and the other is at least one (component C-2) selected from the group consisting of talc and wollastonite.

The average particle diameter of mica (component C-1) as an inorganic filler is a number average particle diameter obtained by observing through a scanning electron microscope and averaging the particle diameters of 1,000 particles sampled at random. The number average particle diameter of mica is 30 to 300 μm, preferably 30 to 280 μm, more preferably 35 to 260 μm. When the number average particle diameter is smaller than 30 μm, the impact strength lowers and the thermal stability of the aromatic polycarbonate resin may deteriorate. When the number average particle diameter is larger than 300 μm, the impact strength improves but the appearance is apt to deteriorate. The deteriorated appearance reduces the slipperiness of a member through which paper passes, which may not be preferred in a case.

Even when the average particle diameter of mica is within the range of the present invention, its preferred range differs according to which importance is attached to appearance or impact strength/stiffness. When importance is attached to appearance, the number average particle diameter of mica is in the range of preferably 30 to 100 μm, more preferably 35 to 80 μm. The resin composition of the present invention may be molded at a very low mold temperature to realize a cost reduction by shortening the molding time. Therefore, to suppress a reduction in slipperiness caused by the deteriorated appearance, mica having a smaller particle diameter is suitably used. When importance is not attached to appearance, mica having an average particle diameter of preferably 100 to 300 μm, more preferably 100 to 260 μm is used from the viewpoints of stiffness and impact strength.

The thickness actually measured by observation through an electron microscope of mica (component C-1) is 0.01 to 10 μm, preferably 0.1 to 5 μm. Mica having an aspect ratio of 5 to 200, preferably 10 to 100 may be used. The used mica (component C-1) is preferably muscovite mica having a Mohs hardness of about 3. Muscovite mica has higher stiffness and strength than other mica such as phlogopite and can attain the object of the present invention at a high level.

As means of grinding mica, there are available a dry grinding method in which a mica ore is ground by a dry grinder and a wet grinding method in which a mica ore is roughly ground by a dry grinder, a grinding aid such as water is added to grind a slurry of mica by a wet grinder, and then dehydration and drying are carried out. The mica of the present invention may be manufactured by either one of the above grinding methods but the dry grinding method is generally used because it is more inexpensive. The wet grinding method is effective in grinding mica into finer and thinner particles but expensive. Mica may be surface treated with a surface treating agent such as a silane coupling agent, higher fatty acid ester or wax, and further granulated with a binder such as a resin, higher fatty acid ester or wax.

The component C-2 which is used in combination with the above mica (component c-1) as an inorganic filler is talc and/or wollastonite. Talc used as the component C-2 is a flaky particle having a lamellar structure and hydrous magnesium silicate in terms of chemical composition generally represented by the chemical formula $4SiO_2 \cdot 3MgO \cdot 2H_2O$ which contains 56 to 65 wt % of $SiO_2$, 28 to 35 wt % of MgO and about 5 wt % of $H_2O$. It further contains 0.03 to 1.2 wt % of $Fe_2O_3$, 0.05 to 1.5 wt % of $Al_2O_3$, 0.05 to 1.2 wt % of CaO, 0.2 wt % or less of $K_2O$ and 0.2 wt % or less of $Na_2O$ as other trace components and has a specific gravity of about 2.7 and a Mohs hardness of 1. In the present invention, when mica having a specific particle diameter (component C-1) is used in combination with talc (component C-2), a flame retardant resin composition having excellent flame retardancy is obtained. It has been unknown that an excellent flame retardant resin composition can be obtained by using a combination of mica having a specific particle diameter and talc as lamellar inorganic fillers.

The average particle diameter of talc is preferably 0.5 to 30 μm. The average particle diameter is a particle diameter at an integration rate of 50 % obtained from a grain size distribution measured by an Andreasen pipet method in accordance with JIS M8016. The particle diameter of talc is preferably 2 to 30 μm, more preferably 5 to 20 μm, particularly preferably 10 to 20 μm. When the particle diameter is within the range of 0.5 to 30 μm, excellent flame retardancy is obtained.

The method of producing talc by milling an ore is not particularly limited. An axial mill, annular mill, roll mill, ball mill, jet mill and container rolling compression shear mill may be used. Further, milled talc is classified by a classifier to obtain particles having a uniform particle size distribution. The classifier is not particularly limited and may be an impactor type inertia classifier (such as a Variable impactor), utilizing Coanda effect type inertia classifier (such as an Elbow jet), centrifugal classifier (such as multi-stage cyclone, Microplex, dispersion separator, Acucut, Turbo Classifier, Turboplex, Micron Separator or Super Separator).

Talc in an agglomerated state is preferred from the viewpoint of handling ease and the like. To manufacture this type of talc, a method in which deaeration compaction is used and a method in which a binder is used for compaction may be used. The method making use of deaeration compaction is preferred because it is simple and an unrequited binder resin component is not contained in the resin composition of the present invention.

Wollastonite as the component C-2 is substantially represented by the chemical formula $CaSiO_3$ and contains about 50 wt % or more of $SiO_2$, about 47 wt % of CaO, $Fe_2O_3$, $Al_2O_3$ and the like. Wollastonite is a white needle-like powder obtained by grinding a wollastonite ore and classifying the obtained particles and has a Mohs hardness of about 4.5. The average fiber diameter of wollastonite in use is preferably 0.5 to 10 μm, more preferably 1 to 5 μm. The average fiber diameter is obtained by observing through a scanning electron microscope and averaging the fiber diameters of 1,000 fibers sampled at random.

Out of the above components C-2, talc is more preferred because it has lower mold wearability. That is, the inorganic fillers (components C) preferably consist of mica (component C-1) and talc (component C-2), and the ratio of the component C-1 to the component C-2 will be described hereinafter.

The resin composition of the present invention comprises an organic phosphorus compound-based flame retardant (component D) as the flame retardant. Use of a relatively small amount of the organic phosphorus compound-based flame retardant (component D) makes it possible to provide excellent flame retardancy to a molded article and improve stiffness (flexural modulus) as well as to reduce specific gravity as compared with a halogen-based flame retardant. In addition, the low melt viscosity of the resin composition based on the plasticizing effect of the organic phosphorus compound also has the effect of reducing the wearability of the surface of a mold.

The organic phosphorus compound-based flame retardant as the component D of the present invention especially is at least one phosphate represented by the following general formula (1):

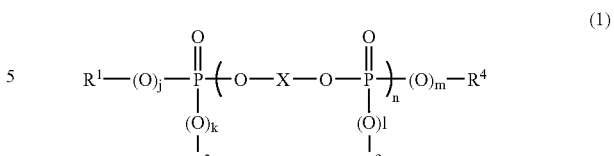

wherein X is a divalent group derived from hydroquinone, resorcinol, bis(4-hydroxydiphenyl)methane, bisphenol A, dihydroxydiphenyl, dihydroxynaphthalene, bis(4-hydroxyphenyl)sulfone, bis(4-hydroxyphenyl)ketone or bis(4-hydroxyphenyl)sulfide, j, k, l and m are each independently 0 or 1, n is an integer of 0 to 5 or an average value of 0 to 5 in the case of a mixture of an n number of different phosphates, and $R^1$, $R^2$, $R^3$ and $R^4$ are each independently a monovalent group derived from phenol, cresol, xylenol, isopropylphenol, butylphenol or p-cumylphenol which is substituted or not substituted by one or more halogen atoms.

More preferred is an organic phosphorus compound-based flame retardant of the above formula in which X is a divalent group derived from hydroquinone, resorcinol, bisphenol A or dihydroxydiphenyl, j, k, l and m are each 1, n is an integer of 1 to 3 or an average value of 1 to 3 in the case of a blend of an n number of phosphates, and $R^1$, $R^2$, $R^3$ and $R^4$ are each independently a monovalent group derived from phenol, cresol or xylenol which is substituted by one or more halogen atoms, preferably not substituted.

The organic phosphorus compound as the component D has a TGA 5% weight reduction temperature of 280° C. or higher when it is heated up to 600° C. from 23° C. at a temperature elevation rate of 20° C./minute in a nitrogen gas atmosphere. The weight reduction temperature is preferably 320° C. or higher, more preferably 330° C. or higher, particularly preferably 340° C. or higher. The upper limit of the weight reduction temperature is suitably 380° C. because an organic phosphorus compound having this upper limit can be generally acquired, more suitably 370° C. An organic phosphorus compound having a relatively high weight reduction temperature is preferred because it can provide excellent heat resistance (excellent load deflection temperature) to the resin composition together with the effect of reducing the melt viscosity of the resin composition.

Taking the above points into consideration, a phosphate oligomer comprising resorcinol bis(dixylenylphosphate) as the main component, phosphate oligomer comprising 4,4-dihydroxydiphenyl bis(dixylenylphosphate) as the main component and phosphate oligomer comprising bisphenol A bis(diphenylphosphate) as the main component are preferred (the expression "main component" means that other components having a different degree of polymerization may be contained in small amounts) out of the phosphates of the above formula.

The resin composition of the present invention comprises a fluorine-containing anti-dripping agent (component E). Excellent flame retardancy can be attained by containing this fluorine-containing anti-dripping agent (component E) without impairing the physical properties of a molded article.

The fluorine-containing anti-dripping agent as the component E is a fluorine-containing polymer having fibril forming capability. Examples of the polymer include polytetrafluoroethylene, tetrafluoroethylene-based copolymers (such as tetrafluoroethylene/hexafluoropropylene copolymer), partially fluorinated polymers as disclosed by U.S. Pat.

No. 4,379,910 and polycarbonate resins produced from a fluorinated diphenol. Out of these, polytetrafluoroethylene (may be abbreviated as PTFE hereinafter) is particularly preferred.

PTFE having fibril forming capability has an extremely high molecular weight and shows a tendency to become fibrous through combination with another PTFE by an external function such as shear force. The molecular weight of PTFE is 1,000,000 to 10,000,000, more preferably 2,000,000 to 9,000,000 in terms of number average molecular weight obtained from standard specific gravity. PTFE may be used in a solid form or aqueous dispersion form. A mixture of PTFE having fibril forming capability and another resin may be used to improve dispersibility in a resin and obtain more excellent flame retardancy and mechanical properties.

Commercially available products of PTFE having fibril forming capability include Teflon 6J of Mitsui-Du Pont Fluorochemical Co., Ltd., and Polyflon MPA FA-500 and F-201L of Daikin Industries, Ltd. Commercially available products of the aqueous dispersion of PTFE include Fluon AD-1 and AD-936 of Asahi ICI Fluoropolymers Co., Ltd., Fluon D-1 and D-2 of Daikin Industries, Ltd., and Teflon 30J of Mitsui.Du Pont Fluorochemical Co., Ltd.

A PTFE mixture may be obtained by (1) a method in which an aqueous dispersion of PTFE and an aqueous dispersion or solution of an organic polymer are mixed together to carry out co-precipitation so as to obtain a co-agglomerated mixture (JP-A 60-258263 and JP-A 63-154744), (2) a method in which an aqueous dispersion of PTFE and dried organic polymer particles are mixed together (method disclosed by JP-A 4-272957), (3) a method in which an aqueous dispersion of PTFE and an organic polymer particle solution are uniformly mixed together and media are removed from the mixture at the same time (JP-A 06-220210 and JP-A 08-188653), (4) a method in which a monomer for forming an organic polymer is polymerized in an aqueous dispersion of PTFE (method disclosed by JP-A 9-95583) or (5) a method in which an aqueous dispersion of PTFE and an organic polymer dispersion are uniformly mixed together and then a vinyl-based monomer is polymerized in the dispersion mixture to obtain a mixture (method disclosed by JP-A 11-29679). Commercially available products of the PTFE mixture include Metablen A3000 (trade name) of Mitsubishi Rayon Co., Ltd. and BLENDEX B449 (trade name) of GE Specialty Chemicals Co., Ltd.

The amount of PTFE in the mixture is preferably 1 to 60 wt %, more preferably 5 to 55 wt % based on 100 wt % of the PTFE mixture. When the amount of PTFE is within the above range, the excellent dispersibility of PTFE can be attained. The amount of the component E shows the net quantity of the fluorine-containing anti-dripping agent or the net quantity of PTFE in the case of the PTFE mixture.

Preferably, the resin composition of the present invention further comprises an ester (component F) of a monohydric or polyhydric alcohol and a higher fatty acid as an optional component. A resin composition having excellent releasability while maintaining the above effect of the present invention can be provided by using the component F. As a result, there is provided a molded article having excellent dimensional stability. Particularly when a more preferred component D is contained in the present invention, the preferred effect of the component F is exhibited. The more preferred component D is as described above.

The higher fatty acid forming the ester as the component F contains 60 wt % or more of a fatty acid having preferably 20 or more carbon atoms (more preferably 20 to 32 carbon atoms, much more preferably 26 to 32 carbon atoms). The higher fatty acid is preferably a higher fatty acid comprising montanic acid as the main component. The higher fatty acid is generally produced by oxidizing montan wax.

Examples of the monohydric alcohol forming the component F include dodecanol, tetradecanol, hexadecanol, octadecanol, eicosanol, tetracosanol, ceryl alcohol and triacontanol.

Examples of the polyhydric alcohol forming the component F include ethylene glycol, glycerin, diglycerin, polyglycerin (such as decaglycerin), pentaerythritol, dipentaerythritol, trimethylolpropane, diethylene glycol and propylene glycol. Out of these, ethylene glycol, glycerin, pentaerythritol, dipentaerythritol and trimethylolpropane are preferred, and ethylene glycol is particularly preferred.

Preferably, the ester of a higher fatty acid comprising montanic acid as the main component and a monohydric or polyhydric alcohol (preferably polyhydric alcohol) has a density of 0.94 to 1.10 g/cm$^3$, an acid value of 1 to 200 and a saponification value of 50 to 200. More preferably, the ester has a density of 0.98 to 1.06 g/cm$^3$, an acid value of 5 to 30 and a saponification value of 100 to 180.

A description is subsequently given of the amounts of the components A to E and the component F as an optional component forming the resin composition of the present invention.

In the resin composition of the present invention, the total amount of the aromatic polycarbonate resin (component A) and the acrylonitrile-styrene copolymer (component B; AS resin) as the resin components is 50 wt % or more, preferably 60 wt % or more based on 100 wt % of the total of the components A, B, C and D. The upper limit of the total amount of the components A and B which is mainly influenced by the amounts of the components C and D is 80 wt %, preferably 76 wt %.

As for the ratio of the components A and B, the amount of the component A is 75 to 95 parts by weight and the amount of the component B is 5 to 25 parts by weight based on 100 parts by weight of the total of the components A and B. Preferably, the amount of the component A is 78 to 92 parts by weight and the amount of the component B is 8 to 22 parts by weight.

The amount of the inorganic fillers (components C) as the total amount of the components C-1 and C-2 is 15 to 35 wt %, preferably 20 to 30 wt % based on 100 wt % of the total of the components A to D. The amount of the component C-1 is 10 to 25 wt %, preferably 10 to 20 wt %, particularly preferably 12 to 20 wt % and the amount of the component C-2 is 3 to 15 wt %, preferably 5 to 15 wt %, particularly preferably 5 to 12 wt % based on 100 wt % of the total of the components A to D. As for the ratio of the components C-1 and C-2, the amount of the component C-1 is 40 to 90 parts by weight and the amount of the component C-2 is 60 to 10 parts by weight based on 100 parts by weight of the total of the components C-1 and C-2. Preferably, the amount of the component C-1 is 50 to 80 parts by weight and the amount of the component C-2 is 50 to 20 parts by weight.

The amount of the organic phosphorus compound (component D) as a flame retardant is 3 to 15 wt %, preferably 3 to 10 wt %, more preferably 3 to 6 wt % based on 100 wt % of the total of the components A to D.

The amount of the fluorine-containing anti-dripping agent (component E) is 0.02 to 2 parts by weight, preferably 0.05 to 2 parts by weight, more preferably 0.1 to 1 part by weight, particularly preferably 0.15 to 0.8 part by weight based on 100 parts by weight of the total of the components A to D.

The amount of the higher fatty acid ester (component F) as a release agent is 2 parts or less by weight, preferably 0.01 to 2 parts by weight, more preferably 0.05 to 1.5 parts by weight, particularly preferably 0.1 to 1.0 part by weight based on 100 parts by weight of the total of the components A to D.

When the resin composition of the present invention has the above composition, a molded article obtained from the composition has excellent physical properties and excellent flame retardancy. That is, the molded article has an impact strength (J/m) of 30 or more, preferably 35 or more, and its upper limit preferably reaches 55. The shrinkage anisotropy of the molded article (absolute value of a difference in molding shrinkage factor (%) between the flow direction and a direction perpendicular to that direction of the molded article) is small at 0.15 or less, preferably 0.10 or less.

The molded article obtained from the resin composition of the present invention can attain V-1 rating in a UL94 flame retardancy test of a 1.6-thick test specimen although it has a relatively small content of the flame retardant (component D).

The present invention provides a molded article having high stiffness and low specific gravity due to a combination of the component B, the components C-1 and C-2 as inorganic fillers and the component D. The specific gravity is 1.3 to 1.45 (g/cm$^3$), or 1.32 to 1.40 (g/cm$^3$) under favorable conditions in terms of true density.

Molded articles obtained from the resin composition comprising the components A to E and the resin composition comprising the components A to F of the present invention have excellent resistance to low-viscosity lubricating oil. A chassis molded product may be coated with lubricating oil in advance or may be coated with lubricating oil while it is in use so that constituent parts which will be assembled with the chassis molded product can function smoothly. Therefore, the above excellent resistance is a preferred property required for the chassis molded product.

Examples of the low-viscosity lubricating oil include hydrocarbon oil, silicone oil and fluorine oil. The molded articles obtained from the resin composition comprising the components A to E and the resin composition comprising the components A to F of the present invention have excellent resistance to hydrocarbon oil which is widely used out of these lubricating oils, particularly to lubricating oil containing paraffin oil as the main component which is the most frequently used.

The above low-viscosity lubricating oil has a kinematic viscosity at 40° C. of 2 to 20 mm$^2$/s, preferably 2 to 10 mm$^2$/s. Specific examples of the low-viscosity lubricating oil include the CRC5-56 of KURE Engineering Ltd.

The resin composition of the present invention has an advantage that the wearability of a mold is very low due to use of a combination of the components C-1 and C-2 as inorganic fillers (components C), thereby making it possible to reduce molding cost.

The resin composition of the present invention may contain other components if they do not impair the object of the present invention and the amounts of the components A to F are maintained. Thermoplastic resins other than the components A and B include polyethylene resin, polypropylene resin, polyalkyl methacrylate resin, polyacetal resin, polyalkylene terephthalate resin, polyamide resin, cyclic polyolefin resin, polyarylate resin (noncrystalline polyarylate, liquid crystal polyarylate), polyether ether ketone, thermoplastic polyimides typified by polyether imide and polyamide-imide, polysulfone, polyether sulfone and polyphenylene sulfide. They may be used in combination with the component A and the component B according to purpose. Particularly when vibration damping properties are required, a polyarylate resin is preferably used in combination because both excellent flame retardancy and vibration damping properties can be obtained.

The flame retardant resin composition of the present invention may further contain a small amount of a rubber-like polymer. The amount of the rubber-like polymer is suitably 1.5 parts or less by weight, preferably 1.3 parts or less by weight, more preferably 1 part or less by weight based on 100 parts by weight of the total of the components A to D.

Specific examples of the rubber-like polymer include SB (styrene-butadiene) polymer, ABS (acrylonitrile-butadiene-styrene) polymer, MBS (methyl methacrylate-butadiene-styrene) polymer, MABS (methyl methacrylate-acrylonitrile-butadiene-styrene) polymer, MB (methyl methacrylate-butadiene) polymer, ASA (acrylonitrile-styrene-acrylic rubber) polymer, AES (acrylonitrile-ethylene propylene rubber-styrene) polymer, MA (methyl methacrylate-acrylic rubber) polymer, MAS (methyl methacrylate-acrylic rubber-styrene) polymer, methyl methacrylate-acryl-butadiene rubber copolymer, methyl methacrylate-acryl-butadiene-styrene copolymer and methyl methacrylate-(acryl-silicone IPN rubber) polymer. These polymers are preferably core-shell type graft copolymers in which a polymer chain composed of the above monomer is bonded to a core made from a polymer comprising a rubber component.

The rubber-like polymer of the present invention may be contained in another component. This rubber-like polymer is, for example, an ABS copolymer contained in ABS resin.

Flame retardants other than the organic phosphorus compound as the component D of the present invention include red phosphorus-based flame retardants, halogen compound-based flame retardants, silicone-based flame retardants and metal salt-based flame retardants. However, in the present invention, what contains only the component D as a flame retardant is preferred.

In the present invention, a small amount of an inorganic filler other than the components C-1 and C-2 may be contained in limits that do not impair the object of the present invention. A glass-based filler (Mohs hardness of about 6.5) such as glass fiber or glass flake, aluminum borate whisker (Mohs hardness of about 7), titanium oxide (Mohs hardness of about 7 for a rutile type) or other high-hardness filler is suitably contained in an amount of 3 parts or less by weight, preferably 1 part or less by weight based on 100 parts by weight of the total of the components A to D. When a filler having a Mohs hardness of 5 or less is used, it may be contained in an amount of more than 3 parts by weight, preferably 5 parts or less by weight.

A heat stabilizer, antioxidant, ultraviolet light absorber, release agent (other than the component F), antistatic agent, blowing agent, dye and pigment (especially carbon black, titanium oxide or the like) may be mixed with the resin composition of the present invention.

The heat stabilizer is a phosphorus-based heat stabilizer such as phosphorous acid, phosphoric acid, phosphonous acid, phosphonic acid or ester thereof. Examples of the heat stabilizer include phosphite compounds such as triphenyl phosphite, trisnonylphenyl phosphite, tris(2,4-di-tert-butylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite and bis(2,4-di-tert-butylphenyl)pentaerythritol diphosphite, phosphate compounds such as tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate, and phosphonite compounds as other phosphorus-based heat stabilizers, such as tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite and bis(2,4-di-tert-butylphenyl)-4-biphenylene phosphonite. Out of these, preferred are trisnonylphenyl phosphite, distearylpentaerythritol diphosphite, bis(2,4-di-tert-butylphenyl)pentaerythritol diphosphite, tris(2,4-di-tert-butylphenyl)phosphite, triphenyl phosphate, trimethyl phosphate, tetrakis(2,4-di-tert-butylphenyl)-4,4'-biphenylene diphosphonite and bis(2,4-di-tert-butylphenyl)-4-biphenylene phosphonite. These heat stabilizers may be used alone or in combination of two or more. The amount of the heat stabilizer is preferably 0.0001 to 1 part by weight, more preferably 0.0005 to 0.5 part by weight, much more preferably 0.002 to 0.3 part by weight based on 100 parts by weight of the total of the components A to D.

Examples of the antioxidant include pentaerythritol tetrakis(3-mercaptopropionate), pentaerythritol tetrakis(3-laurylthiopropionate), glycerol-3-stearylthiopropionate, triethylene glycol-bis([3-(3-t-butyl-5-methyl-4-hydroxyphenyl) propionate], 1,6-hexanediol-bis[3-(3,5-di-t-butyl-4-hydroxyphenyl)propionate], pentaerythritol-tetrakis[3-(3,5-di-t-butyl-4-hydroxyphenyl)propionate], octadecyl-3-(3,5-di-t-butyl-4-hydroxyphenyl)propionate, 1,3,5-trimethyl-2,4,6-tris(3,5-di-t-butyl-4-hydroxybenzyl)benzene, N,N-hexamethylenebis(3,5-di-t-butyl-4-hydroxy-hydrocinnamide), 3,5-di-t-butyl-4-hydroxy-benzyl phosphonate-diethyl ester, tris(3,5-di-t-butyl-4-hydroxybenzyl)isocyanurate, tetrakis(2,4-di-t-butylphenyl)-4,4'-biphenylene diphosphinate and 3,9-bis{1,1-dimethyl-2-[β-(3-t-butyl-4-hydroxy-5-methylphenyl)propionyloxy]ethyl}-2,4,8,10-tetraoxaspiro(5,5)undecane. The amount of the antioxidant is preferably 0.0001 to 0.05 part by weight based on 100 parts by weight of the total of the components A to D.

Examples of the ultraviolet light absorber include benzophenone-based ultraviolet light absorbers typified by 2,2'-dihydroxy-4-methoxybenzophenone, and benzotriazole-based ultraviolet light absorbers typified by 2-(3-tert-butyl-5-methyl-2-hydroxyphenyl)-5-chlorobenzotriazole, 2-(3,5-di-tert-butyl-2-hydroxyphenyl)-5-chlorobenzotriazole, 2,2'-methylenebis[4-(1,1,3,3-tetramethylbutyl)-6-(2H-benzotriazol-2-yl)phenol], 2-[2-hydroxy-3,5-bis(α,α-dimethylbenzyl)phenyl]-2H-benzotriazole and 2-(3,5-di-tert-amyl-2-hydroxyphenyl)benzotriazole. Further, a hindered amine-based optical stabilizer typified by bis(2,2,6,6-tetramethyl-4-piperidyl)sebacate and bis(1,2,2,6,6-pentamethyl-4-piperidyl)sebacate may also be used. The total amount of the ultraviolet light absorber and optical stabilizer is preferably 0.01 to 5 parts by weight based on 100 parts by weight of the total of the components A to D.

As a release agent other than the component F may be used an olefin-based wax, silicone oil, fluorine oil, organopolysiloxane, paraffin wax or beeswax.

Examples of the antistatic agent include polyether ester amide, glycerin monostearate, ammonium salts and phosphonium salts of dodecylbenzene sulfonic acid, maleic anhydride monoglyceride and maleic anhydride diglyceride. The amount of the antistatic agent is preferably 0.5 to 20 parts by weight based on 100 parts by weight of the total of the components A to D.

When the inventor of the present invention conducted further studies, he found that the above advantage and effect of the resin composition are attained by a resin composition which comprises polyphenylene ether resin and polystyrene resin as resin components as well.

According to the present invention, there is provided a flame retardant aromatic polyphenylene ether resin composition (to be referred to as "PPE resin composition" hereinafter) comprising (1) a polyphenylene ether resin (component P), (2) a polystyrene resin (component S), (3) inorganic fillers (components C), (4) an organic phosphorus compound-based flame retardant (component D) and (5) a fluorine-containing anti-dripping agent (component E), the amounts of these components satisfying the following conditions (i) to (iii).

(i) The total amount of the components P and S is 50 wt % or more, the amount of the component C is 15 to 35 wt %, and the amount of the component D is 3 to 15 wt % based on 100 wt % of the total of the components P, S, C and D, and the amount of the component E is 0 to 2 parts by weight based on 100 parts by weight of the total of the components P, S, C and D;

(ii) the amount of the component P is 50 to 85 parts by weight and the amount of the component S is 15 to 50 parts by weight based on 100 parts by weight of the total of the components P and S; and (iii) the components C consist of (C1) mica having an average particle diameter of 30 to 300 μm (component C-1) and (C2) at least one filler (component C-2) selected from the group consisting of talc and wollastonite, the amount of the component C-1 is 10 to 25 wt % and the amount of the component C-2 is 3 to 15 wt % based on 100 wt % of the total of the components P, S, C and D, and the amount of the component C-1 is 40 to 90 parts by weight based on 100 parts by weight of the total of the components C-1 and C-2.

The polyphenylene ether resin (component P) in this PPE resin composition is a polymer or copolymer of a nucleus-substituted phenol having a phenylene ether structure (may be simply referred to as "PPE polymer" hereinafter).

Typical examples of the polymer of a nucleus-substituted phenol having a phenylene ether structure include poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene) ether, poly(2-methyl-6-hydroxyethyl-1,4-phenylene)ether and poly(2-methyl-6-chloroethyl-1,4-phenylene)ether. Out of these, poly(2,6-dimethyl-1,4-phenylene)ether is particularly preferred.

Typical examples of the copolymer of a nucleus-substituted phenol having a phenylene ether structure include a copolymer of 2,6-dimethylphenol and 2,3,6-trimethylphenol, a copolymer of 2,6-dimethylphenol and o-cresol, and a copolymer of 2,6-dimethylphenol, 2,3,6-trimethylphenol and o-cresol.

The method of producing the above PPE polymer is not particularly limited but the PPE polymer can be produced by the oxidation coupling polymerization of 2,6-xylenol in the presence of dibutylamine in accordance with the method disclosed by U.S. Pat. No. 4,788,277 (Japanese Patent Application No. 62-77570).

PPE polymers having different molecular weights and molecular weight distributions may be used. As for the molecular weight, the reduced viscosity measured in a 0.5 g/dl chloroform solution at 30° C. of the PPE polymer is in the range of preferably 0.20 to 0.70 dl/g, more preferably 0.30 to 0.55 dl/g.

The PPE polymer may contain a phenylene ether unit which has been proposed to be contained in a polyphenylene ether resin as a partial structure as far as it is not against the subject matter of the present invention. Examples of the phenylene ether unit which is proposed to be contained in a small amount include 2-(dialkylaminomethyl)-6-methylphenylene ether unit and 2-(N-alkyl-N-phenylaminomethyl)-6-methylphenylene ether unit as disclosed by Japanese Patent Application No. 63-12698 and Japanese Patent Application No. 63-301222. A PPE polymer containing a small amount of diphenoquinone bonded to the main chain may also be used.

In the PPE resin composition of the present invention, a polystyrene resin (component S) is used as a resin component other than the component P. Preferably, the polystyrene resin (component S) comprises styrene as a monomer unit forming the styrene resin in an amount of 85 wt % or more, preferably 90 wt % or more. A generally called polystyrene resin is used. For example, HIPS (high impact polystyrene) is also preferably used.

The PPE resin composition of the present invention comprises inorganic fillers (components C), an organic phosphorus compound-based flame retardant (component D) and a fluorine-containing anti-dripping agent (component E) as an optional component in addition to the resin components P and S. Since examples of the components C, D and E are the same as those of the above resin composition, their descriptions are omitted for the PPE resin composition. The compounds enumerated above are used as the components C, D and E, and preferred examples are the same as those of the components C, D and E.

The amount of each component of the PPE resin composition of the present invention is described hereinbelow.

The total amount of the polyphenylene ether resin (component P) and the polystyrene resin (component S) as resin components is 50 wt % or more, preferably 60 wt % or more based on 100 wt % of the total of the components P, S, C and D, and the upper limit of the total amount of the components P and S which changes according to the amounts of the components C and D is 82 wt %, preferably 75 wt %. As for the ratio of the components P and S, the amount of the component P is 50 to 85 parts by weight and the amount of the component S is 15 to 50 parts by weight based on 100 parts by weight of the total of the components P and S. Preferably, the amount of the component P is 55 to 75 parts by weight and the amount of the component S is 25 to 45 parts by weight based on 100 parts by weight of the total of the components P and S.

The total amount of the inorganic fillers (components C) is 15 to 35 wt %, preferably 20 to 30 wt % as the total of the components C-1 and C-2 based on 100 wt % of the total of the components P, S, C and D. The amount of the component C-1 is 10 to 25 wt %, preferably 10 to 20 wt %, particularly preferably 12 to 20 wt % and the amount of the component C-2 is 3 to 15 wt %, preferably 5 to 15 wt %, particularly preferably 5 to 12 wt % based on 100 wt % of the total of the components P, S, C and D. As for the ratio of the components C-1 and C-2, the amount of the component C-1 is 40 to 90 parts by weight and the amount of the component C-2 is 60 to 10 parts by weight, preferably the amount of the component C-1 is 50 to 80 parts by weight and the amount of the component C-2 is 50 to 20 parts by weight based on 100 parts by weight of the total of the components C-1 and C-2.

The amount of the organic phosphorus compound (component D) as a flame retardant is 3 to 15 wt %, preferably 5 to 12 wt % based on 100 wt % of the total of the components P, S, C and D.

The amount of the fluorine-containing anti-dripping agent (component E) is 2 parts or less by weight, preferably 0.05 to 2 parts by weight, particularly preferably 0.1 to 1 part by weight based on 100 parts by weight of the total of the components P, S and D. A higher fatty acid ester (component F) may be used as a release agent. The amount of the component F is 2 parts or less by weight, preferably 0.01 to 2 parts by weight, particularly preferably 0.05 to 1 part by weight based on 100 parts by weight of the total of the components P, S, C and D.

The flame retardant resin composition (including the PPE resin composition) of the present invention can be produced by mixing together the above components by a mixer such as a tumbler, twin-cylinder mixer, Nauter mixer, Banbury mixer, kneading roll or extruder at the same time or in an arbitrary order. Preferably, they are melt kneaded together by a twin-screw extruder and the components C are supplied from a second supply port by a side feeder or the like to be mixed with other components which have been melt mixed together. The thus obtained composition can be easily formed by an existing technique such as injection molding, extrusion molding, compression molding or rotational molding. A high-accuracy chassis for precision instruments can be formed by injection molding. Injection compression molding and molding with a heat insulating mold can be used in combination to attain higher accuracy, or gas assist molding can be used in combination to reduce weight and distortion.

According to the present invention, there is provided a flame retardant resin composition having excellent stiffness, dimensional accuracy and strength and low mold wearability. There are further provided chassis and frames molded articles from the above resin composition. The flame retardant thermoplastic resin composition of the present invention is particularly suitable for use in chassis and frames for OA-related equipment incorporating a precision part such as an optical unit. The OA-related equipment include printers (especially laser beam printers), copying machines, facsimiles and projectors. The resin composition of the present invention is also suitable for use in chassis and frames for robots for domestic use incorporating precision sensors.

[1-B] is a side view showing the shape of the plate-like molded article for the evaluation of mold wearability used in Examples.

[1-C] is a bottom view showing the shape of the plate-like molded article for the evaluation of mold wearability used in Examples.

Figure 2:
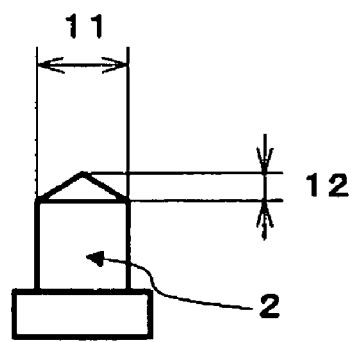

FIG. 2 is a front view showing the shape of a pin for the evaluation of mold wearability used in Examples. A conical end portion is exposed to the surface of a mold cavity and contacts a molten resin.

Figure 3:
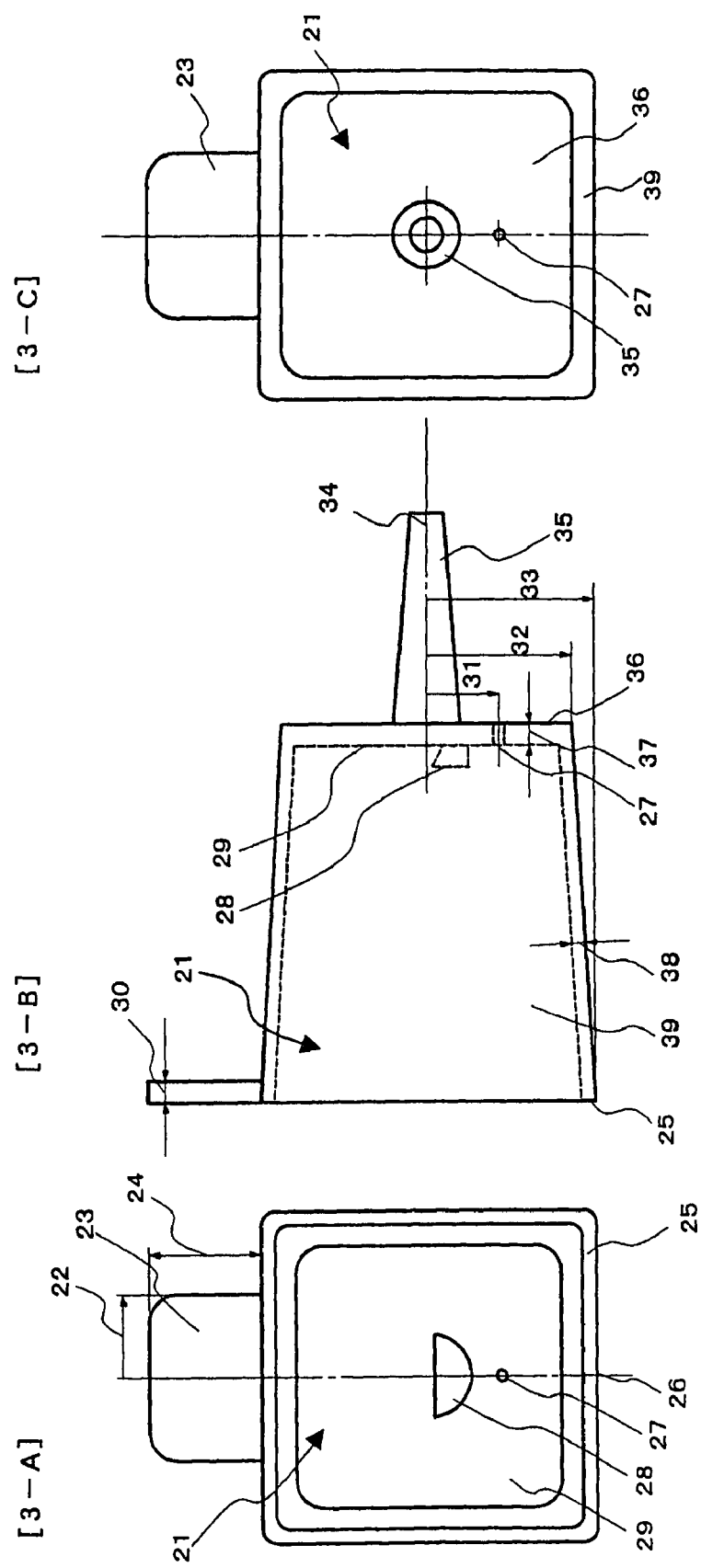

FIG. 3 [3-A] is a front view showing the shape of a cup-like molded article for the evaluation of release force used in Examples.

[3-B] is a side view showing the shape of the cup-like molded article for the evaluation of release force used in Examples.

[3-C] is a bottom view showing the shape of the cup-like molded article for the evaluation of release force.

Figure 4:
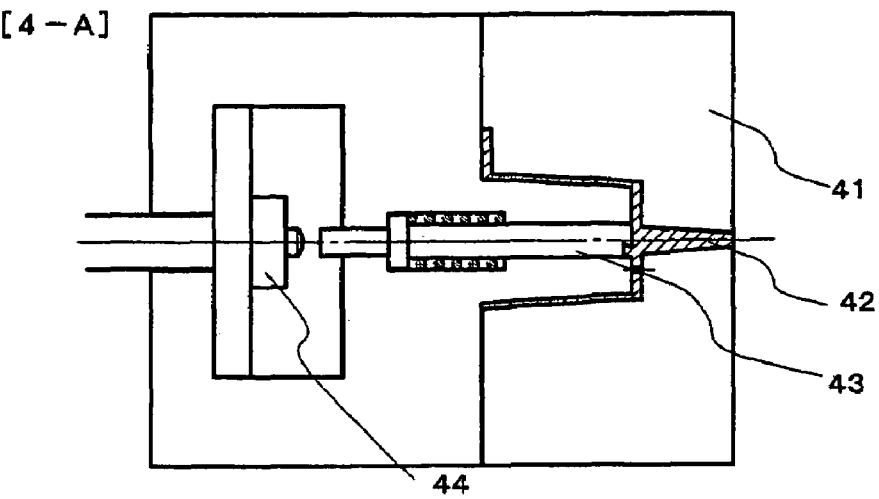
Figure 4:
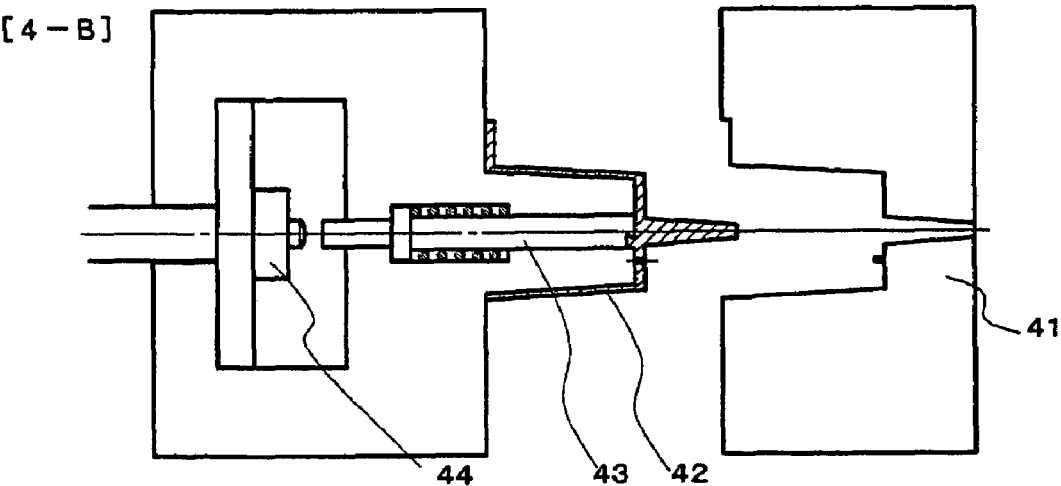
Figure 4:
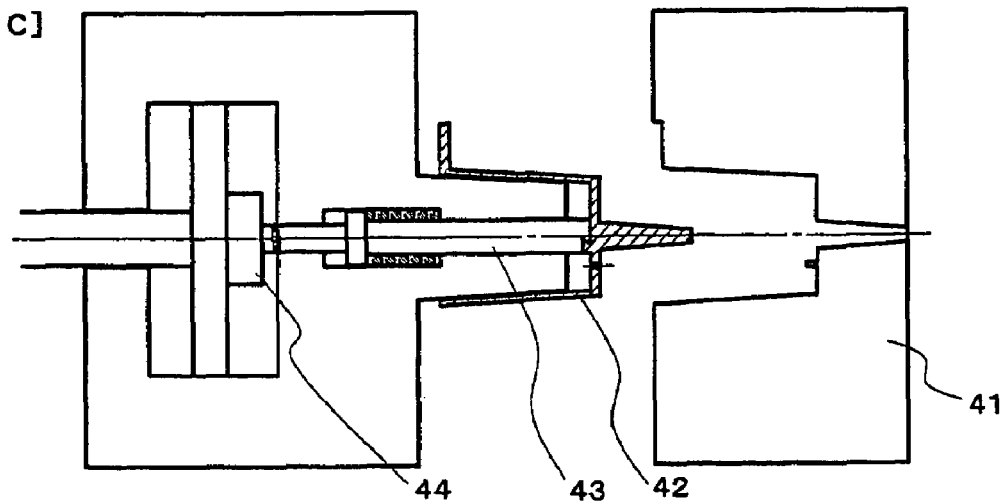

FIG. 4 [4-A] schematically shows a mold structure used for the evaluation of release force. A mold cavity is filled with a resin.

[4-B] shows that the mold is cooled and opened after filling in [4-A]. At this point, a molded article is adhered to a movable mold.

[4-C] shows that an ejector pin is forced out by the advance of an ejector rod after the opening of the mold in [4-B] to remove the molded article. Ejection force is detected by a load cell in contact with the ejector pin.

Figure 5:
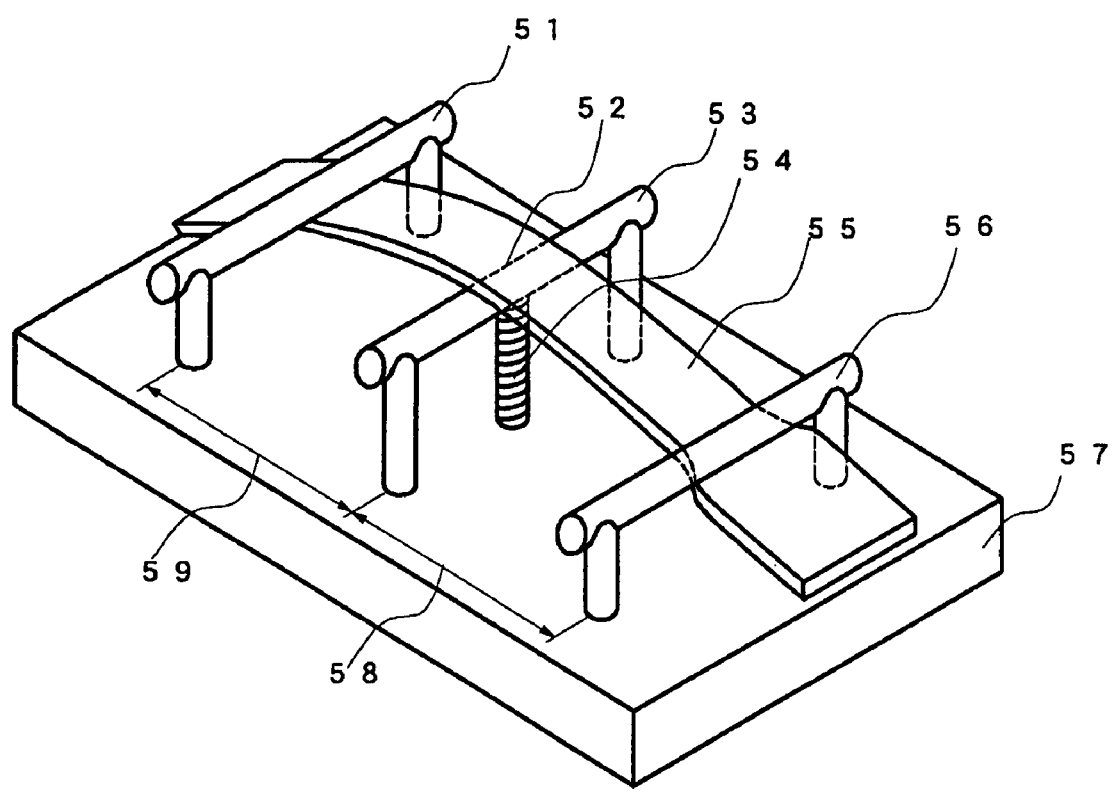

FIG. 5 is a perspective view showing the outline of a jig for 3-point bending in the evaluation of the low-viscosity lubricating oil resistance of a molded article which is one of the evaluation items in the above Examples.

EXPLANATION OF REFERENCE NUMERALS 1 plate-like molded article for the evaluation of mold wearability
2 conical depression formed by a pin
3 gate (4 mm in width, 1.5 mm in thickness)
4 length of the plate-like molded article for the evaluation of mold wearability (100 mm)
5 distance from the gate portion to the pin (10 mm)
6 diameter of the conical depression formed by the pin (pin diameter) (10 mm)
7 center line (center of the pin is existent on the center line of the molded article)
8 depth of the conical depression formed by the pin (pin height) (3 mm)
9 thickness of the plate-like molded article for the evaluation of mold wearability (5 mm)
10 width of the plate-like molded article for the evaluation of mold wearability (50 mm)
11 pin diameter (10 mm)
12 height of the conical portion (portion exposed to the surface of the mold cavity) of the pin (3 mm)
21 cup-like molded article body
22 distance from the axis of symmetry (26) of a grip portion (15 mm)
23 grip portion
24 height of the grip portion (20 mm)
25 top end face of the cup (radius of the corner portion: 2.5 mm)
26 axis of symmetry
27 inner bottom hole (radius of 1 mm)
28 Z pin projection (radius from the center axis to the periphery of 7.5 mm)
29 inner bottom portion of the cup (radius of the corner portion: 5 mm)
30 thickness of the grip portion (4 mm)
31 distance from the center axis (34) to the center axis of the inner bottom hole (27) (13 mm)
32 distance from the center axis (34) to the periphery of the bottom face (36) of the cup (26 mm)
33 distance from the center axis (34) to the periphery of the top end face (25) of the cup (30 mm)
34 center axis of the cup
35 sprue (outer radius: 6 mm, radius of end portion: 3 mm, length: 39 mm)
36 bottom face of the cup
37 thickness of the bottom portion of the cup (4 mm)
38 the thickness of the peripheral portion of the cup (2.5 mm, the same along the entire periphery)
39 outer wall of the cup
41 fixed mold
42 molded article
43 ejector pin (Z pin at the end)
44 load cell
51 first fixing rod (made from stainless steel and having a diameter of 3.9 mm)
52 center portion of a test specimen (placed such that it is positioned at the top of an arc drawn by the test specimen and a gauze impregnated with lubricating oil is placed on that portion)
53 moving rod for applying distortion (made from stainless steel and having a diameter of 3.9 mm)
54 screw for applying distortion (screwed to the rear side of a base 57, turned from a position where it contacts the test specimen under no load to apply a predetermined amount of distortion to the test specimen based on a screw pitch)
55 test specimen (shape in accordance with ASTM D638 Type I)
56 second fixing rod (made from stainless steel and having a diameter of 3.9 mm)
57 base
58 horizontal distance from the second fixing rod to the moving rod for applying distortion (50.0 mm)
59 horizontal distance from the first fixing rod to the moving rod for applying distortion (50.0 mm)

EXAMPLES

The following examples are provided to further illustrate the present invention.

Examples 1 to 11 and Comparative Examples 1 to 6

Components A, B, D, P, S and other components shown in Tables 1 to 6 excluding inorganic fillers (components C-1 and C-2 and an inorganic filler other than the present invention) were mixed together by a twin-cylinder mixer to prepare a mixture. After a pre-mixture of component E and 2.5 wt % of the component A (PC) or P (PPE) was prepared by placing them in a polyethylene bag and stirring manually, it was mixed with the other components. The mixture obtained by mixing by the twin-cylinder mixer was supplied from a first supplying port in the rear-end portion (a predetermined amount of the component D in Examples 4 and 11 was heated at 80° C. and supplied into an extruder by a quantitative liquid transfer unit) and inorganic fillers (components C-1 and C-2 and an inorganic filler other than the present invention) were supplied from a second supply port in a cylinder by a side feeder in a predetermined ratio by using a meter and melt extruded at a cylinder temperature of 270° C. in a vacuum of 3 kPa by using a vented twin-screw extruder having a screw diameter of 30 mm (TEX-30XSST of Japan Steel Works, Ltd.) and a vacuum pump to be pelletized. The obtained pellet was dried at 100° C. by a hot air circulation drier for 6 hours to form a test specimen for evaluation at a cylinder temperature of 260° C. and a mold temperature of 70° C. by an injection molding machine (SG-150U of Sumitomo Heavy Industries, Ltd.) so as to carry out evaluations in accordance with the following methods unless otherwise stated in the following evaluation items.

Figure 1:
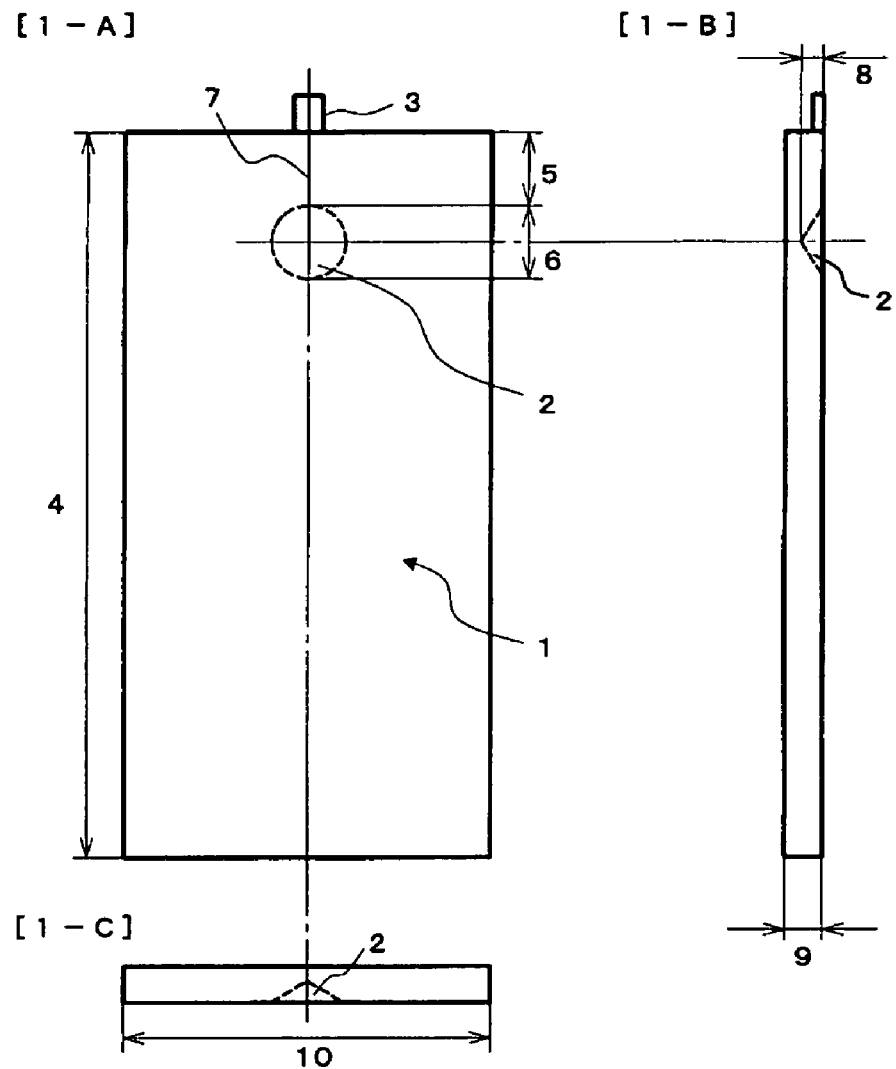
FIG. 1 [1-A] is a front view showing the shape of a plate-like molded article for the evaluation of mold wearability used in Examples. A pin portion arranged near a gate forms a conical depression.

(1) Mechanical Properties of Flame Retardant Resin Composition
(i) stiffness: flexural modulus was measured in accordance with ASTM D-790 (size of test specimen: 127 mm (length)×12.7 mm (width)×6.4 mm (thickness))
(ii) impact resistance: Izod notched impact was measured in accordance with ASTM D-256 (A method: thickness of test specimen: 3.2 mm)
(iii) true density: measured in accordance with ASTM D-792 (23° C.)
(iv) heat resistance: Distortion temperature under load was measured under a load of 1.82 MPa in accordance with ASTM D-648 (size of test specimen: 127 mm (length)× 12.7 mm (width)×6.4 mm (thickness))
(v) flamability: A flaming test was carried out in accordance with UL 94V.
(vi) molding shrinkage factor: After rectangular plates measuring 50 mm (width)×100 mm (length)×4 mm (thickness) were formed by injection molding under the same conditions and left at 23° C. and a relative humidity of 50% for 24 hours, the sizes of the rectangular plates were measured by a 3-D coordinate measuring machine (of Mitsutoyo Corporation) to calculate their molding shrinkage factors. The above rectangular plates were formed by using a mold cavity having a 50 mm wide and 1.5 mm thick film gate at one end in the longitudinal direction. Therefore, the longitudinal direction is a flow direction and the transverse direction is a direction perpendicular to the flow direction. Further, the molding conditions of the rectangular plates are as follows: injection molding machine: SG-150U of Sumitomo Heavy Industries, Ltd, cylinder temperature: 260° C., mold temperature: 70° C., filling time: 0.7 sec, dwell pressure: 61.6 MPa, dwell time: 15 sec., cooling time: 23 sec. Satisfactory molded articles were obtained under the above conditions. Further, as for rectangular plates for size evaluation, after 15 shots were continuously molded under the above conditions, 10 shots were continuously molded and 5 specimens were sampled from the molded products at random. The average value of the specimens was taken as molding shrinkage factor.
(vii) Evaluation of mold wearability: 2,000 shots of the molded product shown in FIG. 1 were molded, and the weight of the pin (made from aluminum) was measured before and after molding to find a reduction in the weight of the pin. The pin was cleaned with hexane, dried at 100° C. with a hot air drier for 3 hours and left to be cooled in a desiccator for 1 hour to measure its weight by an electronic balance. To insert the pin into a mold, lubricating oil was applied to the pin except a portion exposed to the surface of the cavity, and the pin was cleaned with hexane, dried and left to be cooled again in the same manner as described above after the molding test to measure its weight. The evaluation was made as follows.
◎: a weight reduction of 0.05 mg or less
○: a weight reduction of more than 0.05 mg and 0.1 mg or less
Δ: a weight reduction of more than 0.1 mg and 0.2 mg or less
×: a weight reduction of more than 0.2 mg
(viii) measurement of release load
Release force required for removing the cup-like molded article shown in FIG. 3 by ejecting the ejector pin was measured. The outline of the mold used in this measurement is shown in FIG. 4. The measurement of release force was carried out by placing a load cell (9800N) on an ejector plate in such a manner that the distal end of the road cell is contacted to the proximal end of the ejector pin to force out the ejector pin. Force applied to the load cell at the time of ejection was measured by the above means and the maximum value of the force was taken as release force. 40 shots of the cup-like molded article were continuously molded to stabilize release force and 20 shots were continuously molded to measure the release force of each shot and take the average value of the measurement data as release force in Tables 1 to 5. The molding conditions of the cup-like molded article are as follows: injection molding machine: T-series Model 150D of FANUC Ltd., cylinder temperature: 260° C., mold temperature: 70° C., filling time: 2.5 sec., dwell pressure: 58.8 MPa, dwell time: 5 sec., cooling time: 25 sec. Satisfactory molded articles were obtained under the above conditions.
(ix) Evaluation of low-viscosity lubricating oil resistance
After 0.5% bending strain was applied to a 3.2 mm-thick test specimen (tensile specimen TYPE-I) prepared in accordance with ASTM D-638 and low-viscosity lubricating oil (CRC5-56 of Kure Engineering Ltd.: kinematic viscosity at 40° C. of 4.2 mm$^2$/s) was applied to the test specimen and treated at 80° C. for 72 hours, the existence of a crack on the appearance of the molded article was observed visually and the chemical resistance of the molded article was evaluated based on the following criteria. How to mount the test specimen was shown in FIG. 5.
○: not cracked ×: cracked
The bending strain ($\epsilon$=0.005) is calculated from the equation $\epsilon=(6hy)/L^2$ when L is the span between two points at both ends out of 3 points (100 mm), h is the thickness of the test specimen (3.2 mm) and y is the height (mm) to which the test specimen is lifted from the horizontal state.

(2) Composition of Flame Retardant Thermoplastic Resin Composition
The symbols in Tables 1 to 6 represent the following components.

(Component A)
PC-1: aromatic polycarbonate resin (aromatic polycarbonate resin powder having a viscosity average molecular weight of 22,500 produced from bisphenol A and phosgene in accordance with a commonly used method, Panlite L-1225WP of Teijin Chemicals, Ltd.)
PC-2: aromatic polycarbonate resin (aromatic polycarbonate resin powder having a viscosity average molecular weight of 19,700 produced from bisphenol A and phosgene in accordance with a commonly used method, Panlite L-1225WX of Teijin Chemicals, Ltd.)

(Component P)
PPE: polyphenylene ether resin (PPE of GEM Co., Ltd.)

(Component B)
AS-1: acrylonitrile-styrene copolymer (HP5670 of Cheil Industries, Inc., weight average molecular weight in terms of standard polystyrene measured by GPC: 95,000, acrylonitrile content: 28.5 wt %, styrene content: 71.5 wt %)
AS-2: acrylonitrile-styrene copolymer (BS-218 of Nippon A & L Inc., weight average molecular weight in terms of standard polystyrene measured by GPC: 78,000, acrylonitrile content: 26 wt %, styrene content: 74 wt %)

(Component S)
HIPS: polystyrene resin (Denka Styrol GP-1 of Denki Kagaku Kogyo Kabushiki Kaisha)

(Component C-1)

MICA-1: muscovite having an average particle diameter of about 250 μm (WHITE MICA POWDER 60 mesh of Ensei Kogyo Co., Ltd., Mohs hardness: 3)

MICA-2: muscovite having an average particle diameter of about 60 μm (WHITE MICA POWDER 250 mesh of Ensei Kogyo Co., Ltd., Mohs hardness: 3)

MICA-3: muscovite having an average particle diameter of about 40 μm (Kuralite Mica 300D of Kuraray Co., Ltd., Mohs hardness: 3)

MICA-4: muscovite having an average particle diameter of about 40 μm (MC-250 of Hayashi Kasei Co., Ltd., Mohs hardness: 3)

(Component C-2)

TALC-1: talc (Victorylite Talc R of Shokozan Mining Co., Ltd., particle diameter at an integration rate of 50%: 8.5 μm, Hunter whiteness measured in accordance with JIS M8016: 83.8%, pH: 9.6, Mohs hardness: 1)

TALC-2: talc (Victorilite SG-A of Shokozan Mining Co., Ltd., particle diameter at an integration rate of 50%: 15.2 μm, Hunter whiteness measured in accordance with JIS M8016: 90.2%, pH: 9.8, Mohs hardness: 1)

WSN: wollastonite (PH-450 of Kawatetsu Mining Company, Ltd., number average fiber diameter: 1.6 μm, number average fiber length: 6.7 μm, Mohs hardness: 4.5) (inorganic fillers other than the present invention)

MICA-5: muscovite (A-41 of Yamaguchi Mica Co., Ltd., average particle diameter: about 20 μm)

GFL: granular glass flake (Fleka REFG-301 of Nippon Sheet Glass Co., Ltd., median average diameter measured by standard screening method: 140 μm, thickness: 5 μm, Mohs hardness: 6.5)

(Component D)

FR-1: resorcinol bis(dixylenyl phosphate) (Adecastab FP-500 of Asahi Denka Kogyo K.K., TGA 5% weight reduction temperature: 351.0° C.)

FR-2: phosphate comprising bisphenol A bis(diphenyl phosphate) as the main component (CR-741 of Daihachi Chemical Industry Co., Ltd., TGA 5% weight reduction temperature: 335.9° C.)

FR-3: triphenyl phosphate (TPP of Daihachi Chemical Industry Co., Ltd., TGA 5% weight reduction temperature: 239.4° C.)

(Component E)

PTFE: polytetrafluoroethylene having fibril forming capability (Polyflon MPA FA500 of Daikin Industries, Ltd.)

(Component F)

WAX-1: montanate (WAX-E powder of Clariant Japan K.K.) (other components)

WAX-2: acid modified polyolefin-based wax (Diacarna 30M of Mitsubishi Chemical Corporation)

CB: carbon black master (polystyrene resin master containing 40% of carbon black of Koshigaya Kasei Kogyo K.K.)

TABLE 1

| | Item | | Ex. 1 | Ex. 2 | Ex. 3 | Ex. 4 |
|---|---|---|---|---|---|---|
| Composition | Component A (wt %) | PC-1 | 61 | 61 | 61 | 59 |
| | Component B (wt %) | AS-1 | 12 | 12 | 12 | 12 |
| | Component C (wt %) Component C-1 | MICA-1 | 15 | | | |
| | | MICA-2 | | 15 | 15 | 15 |
| | Component C-2 | TALC-1 | 7 | 7 | | |
| | | TALC-2 | | | 7 | 7 |
| | Component D (wt %) | FR-1 | 5 | 5 | 5 | |
| | | FR-2 | | | | 7 |
| | Total of the components A to D: parts by weight | | 100 | 100 | 100 | 100 |
| | Component E (parts by weight) | PTFE | 0.3 | 0.3 | 0.3 | 0.3 |
| | Component F (parts by weight) | WAX-1 | 0.3 | 0.3 | 0.3 | 0.3 |
| | Other components (parts by weight) | CB | 1 | 1 | 1 | 1 |
| Evaluation items | Flexural modulus (MPa) | | 7200 | 6300 | 6200 | 6200 |
| | Impact strength (J/m) | | 42 | 40 | 50 | 40 |
| | True density (g/cm$^3$) | | 1.35 | 1.35 | 1.35 | 1.35 |
| | Heat resistance (° C.) | | 110 | 110 | 110 | 102 |
| | Flamability | | V-1 | V-1 | V-1 | V-1 |
| | Thickness of flaming test specimen (mm) | | 1.6 | 1.6 | 1.6 | 16 |
| | Molding shrinkage factor (%) | Flow direction | 0.27 | 0.28 | 0.28 | 0.28 |
| | | Perpendicular direction | 0.33 | 0.32 | 0.31 | 0.32 |
| | Mold wearability evaluation | | ⊚ | ⊚ | ⊚ | ⊚ |
| | Release load (N) | | 960 | 970 | 960 | 960 |
| | Low-viscosity lubricating oil resistance | | ○ | ○ | ○ | ○ |

Ex. = Example

TABLE 2

| | Item | | | Ex. 5 | Ex. 6 | Ex. 7 |
|---|---|---|---|---|---|---|
| Composition | Component A (wt %) | | PC-1 | 58 | 58 | 61 |
| | Component B (wt %) | | AS-1 | 12 | 12 | 12 |
| | Component C (wt %) | Component C-1 | MICA-2 | 15 | 15 | 15 |
| | | Component C-2 | TALC-2 | 10 | 10 | |

TABLE 2-continued

| | Item | | Ex. 5 | Ex. 6 | Ex. 7 |
|---|---|---|---|---|---|
| | | WSN | | | 7 |
| | Component D (wt %) | FR-1 | | | 5 |
| | | FR-3 | 5 | 5 | |
| | Total of the components A to D: parts by weight | | 100 | 100 | 100 |
| | Component E (parts by weight) | PTFE | 0.3 | 0.3 | 0.3 |
| | Component F (parts by weight) | WAX-1 | | 0.3 | 0.3 |
| | Other components (parts by weight) | WAX-2 | 0.3 | | |
| | | CB | 1 | 1 | 1 |
| Evaluation items | Flexural modulus (MPa) | | 7000 | 7000 | 6400 |
| | Impact strength (J/m) | | 46 | 42 | 40 |
| | True density (g/cm³) | | 1.37 | 1.37 | 1.35 |
| | Heat resistance (° C.) | | 102 | 102 | 109 |
| | Flamability | | V-1 | V-1 | V-1 |
| | Thickness of flaming test specimen (mm) | | 1.6 | 1.6 | 1.6 |
| | Molding shrinkage factor (%) | Flow direction | 0.27 | 0.27 | 0.27 |
| | | Perpendicular direction | 0.31 | 0.31 | 0.33 |
| | Mold wearability evaluation | | ◎ | ◎ | ○ |
| | Release load (N) | | 1280 | 960 | 970 |
| | Low-viscosity lubricating oil resistance | | ○ | ○ | ○ |

Ex. = Example

TABLE 3

| | Item | | Ex. 8 | Ex. 9 | Ex. 10 |
|---|---|---|---|---|---|
| Composition | Component A (wt %) | PC-1 | 61 | 61 | |
| | | PC-2 | | | 61 |
| | Component B (wt %) | AS-1 | 12 | 12 | |
| | | AS-2 | | | 12 |
| | Component C (wt %) Component C-1 | MICA-3 | 15 | 15 | |
| | | MICA-4 | | | 15 |
| | Component C-2 | TALC-2 | 7 | 7 | 7 |
| | Component D (wt %) | FR-1 | 5 | 5 | 5 |
| | Total of the components A to D: parts by weight | | 100 | 100 | 100 |
| | Component E (parts by weight) | PTFE | 0.3 | 0.3 | 0.3 |
| | Component F (parts by weight) | WAX-1 | | 0.3 | 0.5 |
| | Other components (parts by weight) | WAX-2 | 0.3 | | |
| | | CB | 1 | 1 | 1 |
| Evaluation items | Flexural modulus (MPa) | | 6200 | 6200 | 6200 |
| | Impact strength (J/m) | | 42 | 42 | 30 |
| | True density (g/cm³) | | 1.35 | 1.35 | 1.35 |
| | Heat resistance (° C.) | | 110 | 110 | 110 |
| | Flamability | | V-1 | V-1 | V-1 |
| | Thickness of flaming test specimen (mm) | | 1.6 | 1.6 | 1.6 |
| | Molding shrinkage factor (%) | Flow direction | 0.28 | 0.28 | 0.28 |
| | | Perpendicular direction | 0.34 | 0.34 | 0.34 |
| | Mold wearability evaluation | | ◎ | ◎ | ◎ |
| | Release load (N) | | 1860 | 960 | 670 |
| | Low-viscosity lubricating oil resistance | | ○ | ○ | ○ |

Ex. = Example

TABLE 4

| | Item | | C. Ex. 1 | C. Ex. 2 | C. Ex. 3 |
|---|---|---|---|---|---|
| Composition | Component A (wt %) | PC-1 | 61 | 61 | 62 |
| | Component B (wt %) | AS-1 | 12 | 12 | |
| | Component C (wt %) Component C-2 | TALC-2 | 7 | | 30 |
| | Inorganic filler except for Component C (wt %) | MICA-5 | 15 | | |
| | | GFL | | 22 | |
| | Component D (wt %) | FR-1 | 5 | 5 | 8 |
| | Total of the components A to D: parts by weight | | 100 | 100 | 100 |
| | Component E (parts by weight) | PTFE | 0.3 | 0.3 | 0.3 |
| | Other components (parts by weight) | WAX-1 | 0.3 | 0.3 | 0.3 |
| | | CB | 1 | 1 | 1 |
| Evaluation items | Flexural modulus (MPa) | | 6900 | 6600 | 6000 |
| | Impact strength (J/m) | | 25 | 35 | 16 |

TABLE 4-continued

| Item | | C. Ex. 1 | C. Ex. 2 | C. Ex. 3 |
|---|---|---|---|---|
| True density (g/cm$^3$) | | 1.35 | 1.35 | 1.45 |
| Heat resistance (° C.) | | 107 | 108 | 98 |
| Flamability | | V-1 | Not-V | V-1 |
| Thickness of flaming test specimen (mm) | | 1.6 | 2.0 | 1.6 |
| Molding shrinkage factor (%) | Flow direction | 0.27 | 0.23 | 0.19 |
| | Perpendicular direction | 0.32 | 0.34 | 0.24 |
| Mold wearability evaluation | | — | X | — |
| Release load (N) | | 960 | — | — |
| Low-viscosity lubricating oil resistance | | ○ | ○ | ○ |

C. Ex. = Comparative Example

TABLE 5

| | Item | | | C. Ex. 4 | C. Ex. 5 | C. Ex. 6 |
|---|---|---|---|---|---|---|
| Composition | Component A (wt %) | | PC-1 | 61 | 61 | 54 |
| | Component B (wt %) | | AS-1 | 12 | 12 | |
| | | | AS-2 | | | 10 |
| | Component C (wt %) | Component C-1 | MICA-3 | 22 | | |
| | | Component C-2 | TALC-2 | | 22 | |
| | Inorganic filler except for Component C (wt %) | | MICA-5 | | | 30 |
| | Component D (wt %) | | FR-1 | 5 | 5 | |
| | | | FR-3 | | | 6 |
| | Total of the components A to D: parts by weight | | | 100 | 100 | 100 |
| | Component E (parts by weight) | | PTFE | 0.3 | 0.3 | 0.4 |
| | Other components (parts by weight) | | WAX-1 | 0.3 | 0.3 | 0.3 |
| | | | CB | 1 | 1 | 1 |
| Evaluation items | Flexural modulus (MPa) | | | 6600 | 5000 | 10000 |
| | Impact strength (J/m) | | | 45 | 21 | 23 |
| | True density (g/cm$^3$) | | | 1.35 | 1.34 | 1.42 |
| | Heat resistance (° C.) | | | 110 | 108 | 99 |
| | Flamability | | | Not-V | V-1 | V-1 |
| | Thickness of flaming test specimen (mm) | | | 1.6 | 1.6 | 1.6 |
| | Molding shrinkage factor (%) | | Flow direction | 0.26 | 0.32 | 0.23 |
| | | | Perpendicular direction | 0.30 | 0.40 | 0.25 |
| | Mold wearability evaluation | | | ○ | ⊙ | — |
| | Release load (N) | | | 960 | 970 | — |
| | Low-viscosity lubricating oil resistance | | | ○ | ○ | ○ |

C. Ex. = Comparative Example

TABLE 6

| | Item | | | Ex. 11 |
|---|---|---|---|---|
| Composition | Component P (wt %) | | PPE | 48 |
| | Component S (wt %) | | HIPS | 20 |
| | Component C (wt %) | Component C-1 | MICA-2 | 15 |
| | | Component C-2 | TALC-2 | 7 |
| | Component D (wt %) | | FR-2 | 10 |
| | Total of the components A to D: parts by weight | | | 100 |
| | Component E (parts by weight) | | PTFE | 0.3 |
| | Other components (parts by weight) | | CB | 1 |
| Evaluation items | Flexural modulus (MPa) | | | 6000 |
| | Impact strength (J/m) | | | 30 |
| | True density (g/cm$^3$) | | | 1.26 |
| | Heat resistance (° C.) | | | 102 |
| | Flamability | | | V-1 |
| | Thickness of flaming test specimen (mm) | | | 2.0 |
| | Molding shrinkage factor (%) | | Flow direction | 0.27 |
| | | | Perpendicular direction | 0.35 |
| | Mold wearability evaluation | | | ⊙ |
| | Low-viscosity lubricating oil resistance | | | X |

Ex. = Example

As obvious from the tables above, it is understood that the flame retardant thermoplastic resin composition of the present invention has high stiffness, high strength, high dimensional accuracy and excellent flame retardancy and rarely wears away a mold.

Further, in Examples 1 and 2 out of the above Examples, the surface roughness was measured. Plate-like test specimens measuring 150 mm (length)×150 mm (width)×2 mm (thickness) were formed from the dried pellets by injection molding (gate was a fin gate having a width of 40 mm and a thickness of 1 mm from one end of the side of the specimen) to measure their surface roughnesses. The molding conditions of the plate-like test specimens are as follows:

injection molding machine: SG-150U of Sumitomo Heavy Industries, Ltd., cylinder temperature: 260° C., mold temperature: 50° C. (temperature applied by a chiller unit through a 20° C. refrigerant is maintained), filling time: 6 sec., dwell pressure: 75 MPa, dwell time: 3 sec., cooling time: 20 sec. The surface roughness of the plate-like test specimen was measured by the Surfcom 1400A of Tokyo Seimitsu Co., Ltd. As a result, in Example 1, Ra was 2.3 μm and Ry was 19.1 μm. In Example 2, Ra was 1.2 μm and Ry was 8.2 μm. They were extremely excellent when mica having a smaller particle diameter of Example 2 was used. Ra means arithmetic mean roughness and Ry means the maximum height. The measurement was carried out in accordance with JIS B0601.

Chassis molded articles for optical recording medium drives were molded from the resin compositions of Examples 1 to 11. Excellent chassis molded articles were obtained.

EFFECT OF THE INVENTION

The flame retardant resin composition of the present invention can be used in any material which needs mechanical properties such as impact strength, flame retardancy and dimensional stability. It is particularly effective for use in the field of OA equipment which require high dimensional accuracy, such as optical chassis for laser beam printers which are optical unit chassis and structural frames for laser beam printers. The flame retardant resin composition of the present invention has an excellent economical effect for molding because it rarely wears away the screw of a molding machine and a mold. Therefore, its industrial effect is remarkable.

The invention claimed is:

1. A flame retardant aromatic polycarbonate resin composition consisting essentially of:
   (A) an aromatic polycarbonate resin (component A);
   (B) an acrylonitrile-styrene copolymer (component B);
   (C) inorganic fillers (components C);
   (D) an organic phosphorus compound-based flame retardant (component D); and
   (E) a fluorine-containing anti-dripping agent (component E),
   the amounts of the above components satisfying the following conditions (i) to (iv):
   (i) the total amount of the components A and B is 50 wt % or more, the total amount of the components C is 15 to 35 wt %, and the amount of the component D is 3 to 15 wt % based on 100 wt % of the total of the components A to D, and the amount of the component E is 0.02 to 2 parts. by weight based on 100 parts by weight of the total of the components A to D;
   (ii) the amount of the component A is 75 to 95 parts by weight and the amount of the component B is 5 to 25 parts by weight based on 100 parts by weight of the total of the components A and B;
   (iii) the components C consist of (C1) mica having an average particle diameter of 30 to 300 μm (component C-1) and (C2) at least one filler (component C-2) selected from the group consisting of talc and wollastonite, the amount of the component C-1 is 10 to 25 wt % and the amount of the component C-2 is 3 to 15 wt % based on 100 wt % of the total of the components A to D, and the amount of the component C-1 is 50 to 90 parts by weight based on 100 parts by weight of the total of the components C-1 and C-2; and
   (iv) the resin composition contains 1.5 parts or less by weight of acrylonitrile-butadiene-styrene polymer based on 100 parts by weight of the total of the components A to D.

2. The resin composition of claim 1, wherein the component C-2 is talc having an average particle diameter of 0.5 to 30 μm.

3. The resin composition of claim 1 which provides a molded article having a shrinkage anisotropy of 0.15 or less and an impact strength of 30 J/m or more.

4. The resin composition of claim 1 which provides a molded article having V-1 rating in the UL94 flame retardancy test of a 1.6 mm-thick test specimen.

5. The resin composition of claim 1 which provides a molded article having resistance to lubricating oil having a kinematic viscosity at 40° C. of 2 to 22 mm$^2$/s.

6. The resin composition of claim 1 which provides a molded article having a true density of 1.3 to 1.45 (g/cm$^3$).

7. The resin composition of claim 1, wherein the acrylonitrile-styrene copolymer (component B) has a weight average molecular weight of 40,000 to 200,000.

8. The resin composition of claim 1, wherein the acrylonitrile-styrene copolymer (component B) contains an acrylonitrile component and a styrene component in a weight ratio of 5:95 to 50:50.

9. The resin composition of claim 1, wherein mica (component C-1) out of the inorganic fillers (components C) has an average particle diameter of 40 to 280 μm.

10. The resin composition of claim 1, wherein the organic phosphorus compound-based flame retardant (component D) is an organic phosphate.

11. The resin composition of claim 1, wherein the organic phosphorus compound-based flame retardant (component D) has a 5% weight reduction temperature of 280 to 380° C.

12. The resin composition of claim 1, wherein the total amount of the components A and B is 60 wt % or more, the total amount of the components C is 20 to 30 wt %, and the amount of the component D is 3 to 10 wt % based on 100 wt % of the total of the components A to D, and the amount of the component B is 0.1 to 1 part by weight based on 100 parts by weight of the total of the components A to D.

13. The resin composition of claim 1, wherein the amount of the component A is 78 to 92 parts by weight and the amount of the component B is 8 to 22 parts by weight based on 100 parts by weight of the total of the components A and B.

14. The resin composition of claim 1, wherein the amount of mica (component C-1) is 12 to 20 wt % and the amount of the component C-2 is 5 to 12 wt % based on 100 wt % of the total of the components A to D, and the amount of the component C-1 is 50 to 80 parts by weight based on 100 parts by weight of the total of the components C-1 and C-2.

15. A molded article formed from the resin composition of claim 1.

16. A chassis or frame molded article formed from the resin composition of claim 1.

* * * * *